US009613008B2

(12) United States Patent
Newman et al.

(10) Patent No.: US 9,613,008 B2
(45) Date of Patent: Apr. 4, 2017

(54) DYNAMIC AGGREGATION AND DISPLAY OF CONTEXTUALLY RELEVANT CONTENT

(71) Applicant: AOL Inc., Dulles, VA (US)

(72) Inventors: Eric Newman, Leesburg, VA (US); James Lockett, Ashburn, VA (US)

(73) Assignee: AOL Inc., Dulles, VA (US)

( * ) Notice: Subject to any disclaimer, the term of this patent is extended or adjusted under 35 U.S.C. 154(b) by 439 days.

(21) Appl. No.: 14/150,450

(22) Filed: Jan. 8, 2014

(65) Prior Publication Data

US 2014/0189480 A1 Jul. 3, 2014

Related U.S. Application Data

(60) Continuation of application No. 13/053,917, filed on Mar. 22, 2011, now Pat. No. 8,656,264, which is a division of application No. 11/764,462, filed on Jun. 18, 2007, now Pat. No. 7,917,840.

(60) Provisional application No. 60/942,190, filed on Jun. 5, 2007.

(51) Int. Cl.
*G06F 17/00* (2006.01)
*G06F 17/22* (2006.01)
*G06F 17/30* (2006.01)

(52) U.S. Cl.
CPC .... *G06F 17/2235* (2013.01); *G06F 17/30867* (2013.01); *G06F 17/30893* (2013.01)

(58) Field of Classification Search
CPC ................................................. G06F 17/2235
See application file for complete search history.

(56) References Cited

U.S. PATENT DOCUMENTS

| | | | |
|---|---|---|---|
| 5,822,539 | A | 10/1998 | van Hoff |
| 5,890,171 | A | 3/1999 | Blumer et al. |
| 5,956,740 | A | 9/1999 | Nosohara |
| 6,122,647 | A | 9/2000 | Horowitz et al. |

(Continued)

FOREIGN PATENT DOCUMENTS

WO WO 2007/047971 4/2007

OTHER PUBLICATIONS

Li, Wen-Syan et al., "WebDB: A Web Query System and its Modeling, Language, and Implementation", C&C Research Laboratories, NEC USA, Inc., 1998, pp. 1-12.

(Continued)

*Primary Examiner* — Laurie Ries
(74) *Attorney, Agent, or Firm* — Finnegan, Henderson, Farabow, Garrett & Dunner LLP

(57) ABSTRACT

A web-based system scans content for specific terms, and transforms occurrences of the terms into hypertext links. Each hypertext link provides access to a dynamically generated web page which contains aggregated content related to the respective term. The aggregated content may be gathered through a distributed keyword search of various content sources, including web sites and other sources on a wide area network. The results of the keyword search are aggregated into a single page or document, preferably with filtering to remove page elements not well suited for display on a mobile device. Occurrences of specific terms on this dynamically generated page may similarly be transformed into links, such that the user can browse content from various sources within a confined environment.

18 Claims, 23 Drawing Sheets

(56) References Cited

U.S. PATENT DOCUMENTS

| | | |
|---|---|---|
| 6,253,248 B1 | 6/2001 | Nakai et al. |
| 6,272,490 B1 | 8/2001 | Yamakita |
| 6,438,580 B1 | 8/2002 | Mears et al. |
| 6,473,730 B1 | 10/2002 | McKeown et al. |
| 6,516,312 B1* | 2/2003 | Kraft .................. G06F 17/3061 707/610 |
| 6,625,619 B1* | 9/2003 | McClendon ...... G06F 17/30873 |
| 6,751,778 B1 | 6/2004 | Broman et al. |
| 6,812,941 B1 | 11/2004 | Brown et al. |
| 6,823,325 B1 | 11/2004 | Davies et al. |
| 7,092,934 B1* | 8/2006 | Mahan .............. G06F 17/30864 |
| 7,181,451 B2 | 2/2007 | Dehlinger et al. |
| 7,444,348 B2 | 10/2008 | Fries et al. |
| 7,523,104 B2 | 4/2009 | Tanigawa et al. |
| 7,548,915 B2 | 6/2009 | Ramer et al. |
| 7,565,409 B2 | 7/2009 | Heilbron et al. |
| 8,453,044 B2* | 5/2013 | Markus ........................ 707/769 |
| 2001/0047373 A1* | 11/2001 | Jones .................. G06F 3/0481 715/210 |
| 2002/0126155 A1* | 9/2002 | Lin-Hendel ........... G06F 3/0485 715/785 |
| 2002/0143808 A1* | 10/2002 | Miller ............... G06F 17/30882 715/205 |
| 2003/0078766 A1* | 4/2003 | Appelt .............. G06F 17/30616 704/9 |
| 2003/0195872 A1* | 10/2003 | Senn ................. G06F 17/30864 |
| 2004/0044952 A1* | 3/2004 | Jiang ................. G06F 17/30616 715/256 |
| 2004/0133564 A1* | 7/2004 | Gross ................ G06F 17/30398 |
| 2005/0071478 A1* | 3/2005 | Bates .................. G06F 17/3089 709/228 |
| 2005/0223023 A1* | 10/2005 | King ................ G06F 17/30893 |
| 2007/0005652 A1* | 1/2007 | Choi ................. G06F 17/30876 |
| 2007/0130109 A1 | 6/2007 | King et al. |
| 2007/0168344 A1* | 7/2007 | Brinson, Jr. ...... G06F 17/30648 |
| 2007/0219987 A1* | 9/2007 | Mueller ............ G06F 17/30613 |
| 2007/0271235 A1* | 11/2007 | Frank ................ G06F 17/30241 |
| 2008/0098005 A1* | 4/2008 | Goradia ............ G06F 17/30867 |
| 2008/0147640 A1* | 6/2008 | Schachter ......... G06F 17/30867 |
| 2008/0189261 A1 | 8/2008 | Andreev et al. |
| 2008/0244375 A1* | 10/2008 | Gentile ............ G06F 17/30734 715/205 |
| 2008/0288489 A1 | 11/2008 | Kim |
| 2009/0182755 A1 | 7/2009 | Adair et al. |
| 2009/0292700 A1 | 11/2009 | Castellani et al. |
| 2010/0005081 A1 | 1/2010 | Bennett |
| 2012/0036420 A1 | 2/2012 | Waldo et al. |

OTHER PUBLICATIONS

Yahoo! Search-Web Search, http://yq.search.yahoo.com (last visited Aug. 2, 2007).

Infogin—The Whole Web @ Your Call, http://infogin.com/overview.asp (last visited Aug. 2, 2007).

\* cited by examiner

```
TERMS

TERM_ID :          3EDF4EDFGYT5ESE2
TERM :             EAGLES
GROUP_ID :         NEWS
SYNONYMS :
RELATED_WORDS :
DISAMBIGUATORS :   MUSIC; FOOTBALL; BIRD;
URLS :             HTTP://WWW.EAGLES.COM
```

*FIG. 11C*

DYNAMIC AGGREGATION AND DISPLAY OF CONTEXTUALLY RELEVANT CONTENT

PRIORITY CLAIM

This application is a continuation of U.S. application Ser. No. 13/053,917, filed Mar. 22, 2011 (now allowed), which is a divisional of U.S. application Ser. No. 11/764,462, filed on Jun. 18, 2007, now U.S. Pat. No. 7,917,840, which claims the benefit of U.S. Provisional Application No. 60/942,190, filed Jun. 5, 2007. The above-referenced applications are expressly incorporated herein reference in their entireties.

BACKGROUND OF THE INVENTION

Field of the Invention

This disclosure relates to the dynamic aggregation and display of content. The disclosure also relates to the display of aggregated content on handheld devices.

Description of the Related Art

As the use of computer networks such as the Internet continues to grow, it becomes a primary source of information for many users. Devices having a smaller form-factor such as smart phones, Personal Digital Assistants (PDAs), and ultra-light notebook computers are emerging as primary tools to access content. However, because these devices typically have limited pixel areas, much content remains inaccessible to these types of devices, as many websites are optimized for high resolution screens. Although some websites are made available to small form-factor devices using "mobile" versions specifically designed for limited pixel area, most websites do not provide this service.

SUMMARY OF THE DISCLOSURE

One embodiment of the invention is a web-based system that scans content for specific terms, and transforms occurrences of the terms into hypertext links. Each hypertext link provides access to a dynamically generated web page which contains aggregated content related to the respective term. The aggregated content may be gathered through a distributed keyword search of various content sources, including web sites and other sources on a wide area network. The results of the keyword search are aggregated into a single page or document, preferably with filtering to remove page elements not well suited for display on a mobile device. Occurrences of specific terms on this dynamically generated page may similarly be transformed into links, such that the user can browse content from various sources within a confined environment. The terms that are capable of being transformed into links are preferably maintained in a taxonomy that associates terms with specific topics and subjects. The system preferably uses the taxonomy to control the searching process such that the dynamically generated pages tend to be highly relevant to topic or subject the user is reading about.

In another embodiment, a method of dynamically generating web pages is provided. The method includes automatically determining that a first object (e.g., a term) displayable on a first web page matches a first predefined object in a set of objects of interest (e.g., a taxonomy of terms). In response, the first object is automatically established as a first hypertext link on the first web page. In response to selection of the first hyperlink by the user, a second web page is output for display to the user. The second web page is generated by at least accessing results of a search for web-accessible content based on the first predefined object, aggregating portions of one or more results of the search into the second web page, and additionally determining that a second object displayable on the second web page matches a second predefined object in a set of objects of interest. In response to the additionally determining, the second object is established as a second hypertext link on the second web page. The invention also comprises a computer system, and executable code stored in computer storage, that embody the foregoing method.

In another embodiment, a computer-implemented method comprises generating a first web page containing textual content that is responsive to a request from a user computing device, wherein generating the first web page comprises scanning the textual content for each of a plurality of terms, and in response to detecting an occurrence of a first term of said plurality of terms, transforming the occurrence of the first term into a first hyperlink. The method also includes transmitting the first web page to the user computing device for display to a user and generating a second web page which is responsive to the first hyperlink, wherein generating the second web page comprises using the first term to execute a keyword search, aggregating a plurality of content items located by the keyword search, scanning the plurality of content items for occurrences of individual terms of said plurality of terms, and transforming occurrences of individual terms of said plurality of terms into respective hyperlinks. The second web page is then transmitted to the user computing device in response to user selection of the first hyperlink on the first web page. The invention also comprises a computer system, and executable code stored in computer storage, that embody the foregoing method.

In still another embodiment, a system for providing dynamic generation of network content is provided. The system includes a first module configured to determine that a term in a web page is present in a database of terms, convert the term into a hypertext link in the web page, receive a user request to access the hypertext link, and generate a search request based on the hypertext link. The system further includes a second module configured to receive the generated search request, determine a plurality of external sources to receive the search request, send the search request to each of the external sources in parallel. The second module may be configured to receive a response to the search request from each of the external sources, aggregate the received responses into a single web page, and send the single web page to the first module. The first module may be further configured to extract predefined types of content elements from said web content to facilitate display of the single web page on a screen of a handheld device.

In still another embodiment, a computer-implemented method of generating a web page is provided. The method includes determining that a term appearing in a first web page is present in a record of a database table storing a plurality terms, wherein the record includes metadata about the term, the metadata including a plurality of words, each of the plurality of words being related to one of a plurality of possible meaning for the term. The method further includes creating a query string based on the term and scanning the first web page for an instance of any of the plurality to words. At least one of the plurality of words is located in the first web page, and the query string is modified based on the at least one located word. A second web page is then generated based on the modified query string, wherein generating the second web page comprises using the modified query string to execute a keyword search, and aggregating a plurality of content items located by the keyword search.

BRIEF DESCRIPTION OF THE DRAWINGS

FIG. 11C is an example of a term record.

DETAILED DESCRIPTION OF SPECIFIC EMBODIMENTS

Figure 1A:
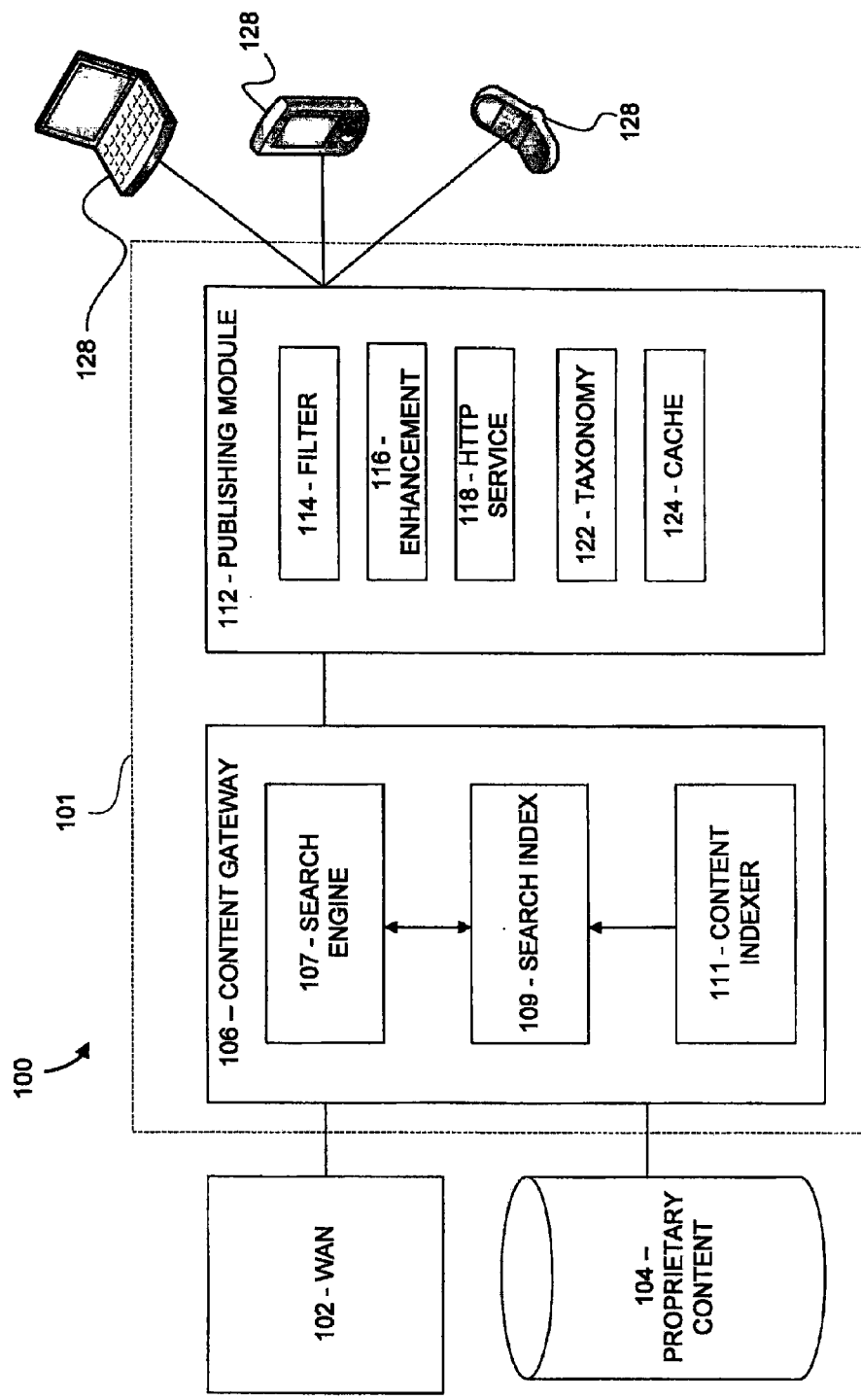
FIGS. 1A-1D are block and system diagrams illustrating various aspects of a system which dynamically generates content on a computer network according to one or more embodiments.

Various embodiments are disclosed of a system that provides dynamic page generation services. These services provide for an improved browsing experience on a network-enabled device, without requiring users to install any browser plug-in or other special software on their computing devices. Using the dynamic page generation services, a user is able to follow dynamically generated links related to objects or topics of interest without requiring extensive typing of search terms or URL destinations.

In certain embodiments, the system, which may be exposed to users as a website or an area of a website, dynamically generates its own web of content by aggregating content from existing sources of data, such as the World Wide Web and/or proprietary databases or feeds, such as RSS or Atom feeds for example. Each new page is preferably dynamically generated by performing a search on a hypertext-linked, identified term from a prior page, and by aggregating some or all of the search results into a single generated page. (The word "term," as used herein, is intended to encompass both text strings without spaces such as "baseball", and text strings with spaces, such as "NBA scores" or "presidential election.")

For example, if the user selects the term "2008 Olympics" while viewing a document, the system may search for documents (news articles, web pages, etc.) related to the 2008 Olympics, and aggregate these documents into a single web page/document for display on the user's device. As discussed below, this web page may be optimized for display on a handheld computing device. Unlike a search result page generated by a conventional Internet search engine, the dynamically generated page may include most or all of the textual content of the documents (or most highly ranked documents) returned by the search.

Specific terms appearing in the aggregated content are preferably transformed by the system into hyperlinks that may be selected by the user to view additional pages. These additional pages may be generated by the system using the same content searching and aggregation process. The terms that are capable of being transformed into hyperlinks by the system are preferably maintained in a taxonomy that associates specific terms with specific subjects or topics, as described below. Although the content that is aggregated into the dynamically generated documents may come from a variety of different web sites and Internet domains, the system enables the user to view the content as part of a single web site and using a consistent user interface.

By transforming occurrences of specific terms into hyperlinks, the system provides a clean user interface which allows users to navigate primarily by clicking on hyperlinks, thereby creating a click-centric (as opposed to keyboard-centric), browsing experience. This type of browsing experience may be especially advantageous when the client device has limited keyboard functionality. However, the disclosed system and methods may also be used to enhance the browsing experience of PC users, and users of other computers having a full keyboard.

Further embodiments provide dynamic generation of page content which is particularly suited for small screen and/or limited pixel area devices such as smart phones, PDAs, handheld computers and the like. In these embodiments, the original page content retrieved in response to clicking a hypertext link is reformatted to provide improved display on the smaller devices. The reformatting process can remove page content that is not well suited for display on the client device.

In some embodiments, the terms that are capable of being transformed into hyperlinks are organized into a taxonomy of topics. The system uses this taxonomy to map specific occurrences of the terms to specific topics, optionally based on a contextual analysis of how the term is being used. Thus, for example, different occurrences of the same term may be mapped to different topics of subject. For example, the system may use the taxonomy to assess whether an occurrence of the term "Eagles" refers to the football team, the rock band, or the bird itself. The placement of the term within the taxonomy can be leveraged in the search process to produce more meaningful results. For example, if the context surrounding the term "Eagles" includes references to music, the system may respond to user selection of the highlighted term by generating and returning a page with aggregated content related to the Eagles band. The system may do this by, for example, executing a keyword search in which the term Eagles is combined with music-related terms, and/or by limiting the scope of the search to one or more particular databases or web sites, such as a music database or site.

The taxonomy may also specify related terms, including synonyms, slang and abbreviations, that are used by the system to widen the scope of the search. For instance, the taxonomic entry for "Eagles" in the music category may include "Glenn Frey" (the name of an Eagles band member) as a related term. The system may use this information to include within the scope of its search any documents that include "Glenn Frey," regardless of whether these documents include "Eagles."

FIG. 1 is a block diagram of a network environment 100 suitable for implementation of a various components of a dynamic content generation system 101. The network environment may include a wide area network 102. The wide area network 102 may be or include the Internet, or it may be some other network such as a television system network, a wireless network, a central asset repository, or the like. The wide area network 102 typically includes many websites which provide access to content such as news stories, blogs, video, audio data, images, and other types of data. The dynamic content generation system 101 may be configured to access the WAN 102 to retrieve page content for processing and display to a user via a computing device 128. In one embodiment, the only software needed on the user computing devices 128 is an ordinary web browser capable of loading and displaying HTML-based web pages.

Also part of the network environment 100 may be proprietary content 104. The proprietary content 104 may be part of the WAN 102, or it may be part of a local network which includes the dynamic content generation system 101. Collectively, the WAN 102 and the proprietary content 104 may provide access to various data sources through web feeds, XML gateways, RSS feeds, or some other content access mechanism.

The content generation system 101 may include various modules. For example, the system 101 may include a content gateway 106. The content gateway 106 typically is used to provide a search platform which collects data from the WAN 102 and the proprietary content 104 and indexes the collected data to allow fast searches of the collected data. The content gateway 106 may include a search engine 107 that uses a search index 109 to conduct keyword searches. The search index 109 is continuously or periodically updated by a content indexer 111 that analyzes crawled web pages and other content sources. The content gateway 106 may further include various sub-modules which are described in additional detail below in connection with FIG. 1D.

The dynamic content generation system 101 may further include a publishing module 112. The publishing module 112 receives the content from content gateway 106 and processes the content for delivery to the computing devices 128. The publishing module 112 includes various sub-modules which may assist in the processing of the received content. One sub-module of the publishing module is a filtering module 114. The filtering module 114 may configured to identify certain content elements within the content received from the content gateway 106 and to remove those content elements so they are not sent to the computing devices 128. In some embodiments, the filtering module 114 may be configured to remove page elements that are not likely to perform well or at all on a small form-factor device such as a mobile phone or handheld computer 128. The filtering module 114 may include filters which remove elements such as IFRAMES, EMBED objects, FLASH content, rich media advertisements, HTML or XML tables, JavaScript, HTML forms, DHTML, AJAX, excessive whitespace, and/or external page links. Other filters perform view enhancing functions, such as real-time dynamic resizing of images to ensure that they are completely visible on-screen without scrolling, and do not significantly impact page load time. The filtering may help to maximize the page-loading performance of the content, as well prevent browser access to unfiltered destinations which are not likely to be supported on the device.

The publishing module 112 may further include a page enhancement module 116. The page enhancement module 116 generally is used to enhance the content delivered to the system 101 via the content gateway 106 prior to its delivery to the computing devices 128. In some embodiments, the enhancement module 116 is configured to analyze the content of the page data and convert certain recognized terms into highlighted and/or hypertext links which may be selected by a user. When the user selects a highlighted term, the system 101 is configured to search the syndicated data collected by the feed module 106 for content related to the search term. The terms which are converted into hyperlinked text may be derived from a taxonomy module 122 which classifies and stores terms which may be of interest to users—a process which will be described in further detail below. The publishing platform 112 may further include a HTTP service 118. The HTTP service 118 may take the form of a traditional web server which receives HTTP requests from web browsing software stored on computing devices 128 and in response to those requests delivers the requested web pages to the computing devices.

In some embodiments, the publishing module 112 may also include a document cache 124. The cache 124 may be used to store pages that have been recently requested by the clients 128. Typically, a page generated by the publishing module 112 in response to a request from a client computing device 128 may be cached for a limited period of time. If the same page data is requested again while it is stored in the cache, the publishing module can quickly deliver the content from the cache rather than re-generating the page. This page caching allows the system 101 to deliver the page while preserving system resources. In addition, when a page is generated by the publishing module 112 and displayed to a user via the HTTP service 118, the publishing module may be configured to preemptively generate and cache all pages which are linked to in the displayed page content but do not already reside in the cache 124. This caching may be done in advance of the user's selection of any link in the page in order to improve performance. The caching of the generated documents, however, is not essential to the invention.

Figure 1B:
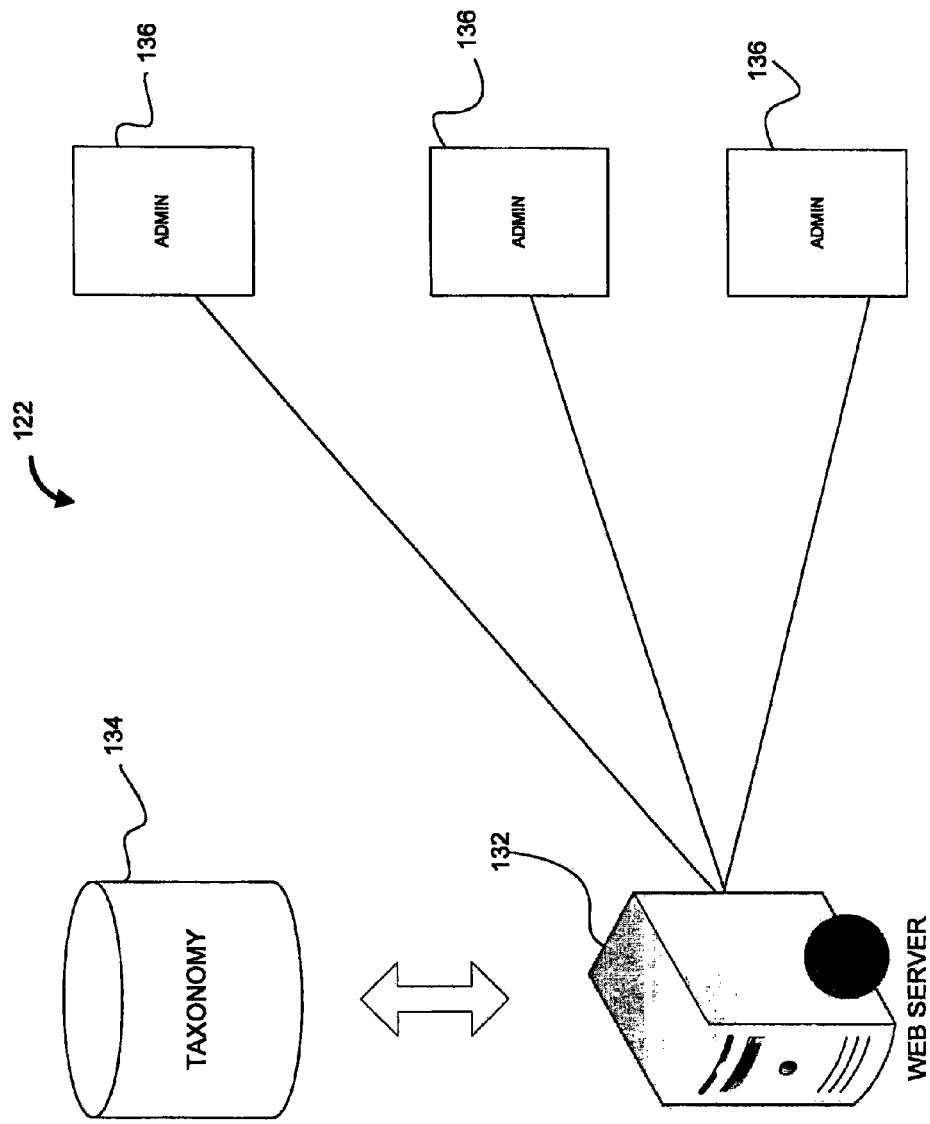

FIG. 1B is a more detailed view of an example hardware configuration for the taxonomy module 122. The taxonomy used to create hyperlinked text within the publishing platform 112 is stored within a database 134 which is part of the taxonomy module 122. The database 134 may be a relational database which includes a database schema suitable for classifying data and content in a manner which is discussed in additional detail below. The database 134 may be modified and supplemented via SQL query calls sent to it by a web application server 132. The web application server 132 may include a web application which allows users (such as taxonomy editors and/or administrators, for example) to update and manage the taxonomy database 134 via an administrative module which is provided via a web browser stored on a client computer 136. The administrative module may be accessible via a web site associated with the web application server 132, and may be secured to provide selective access to the users authorized to modify the taxonomy database 134.

Figure 1C:
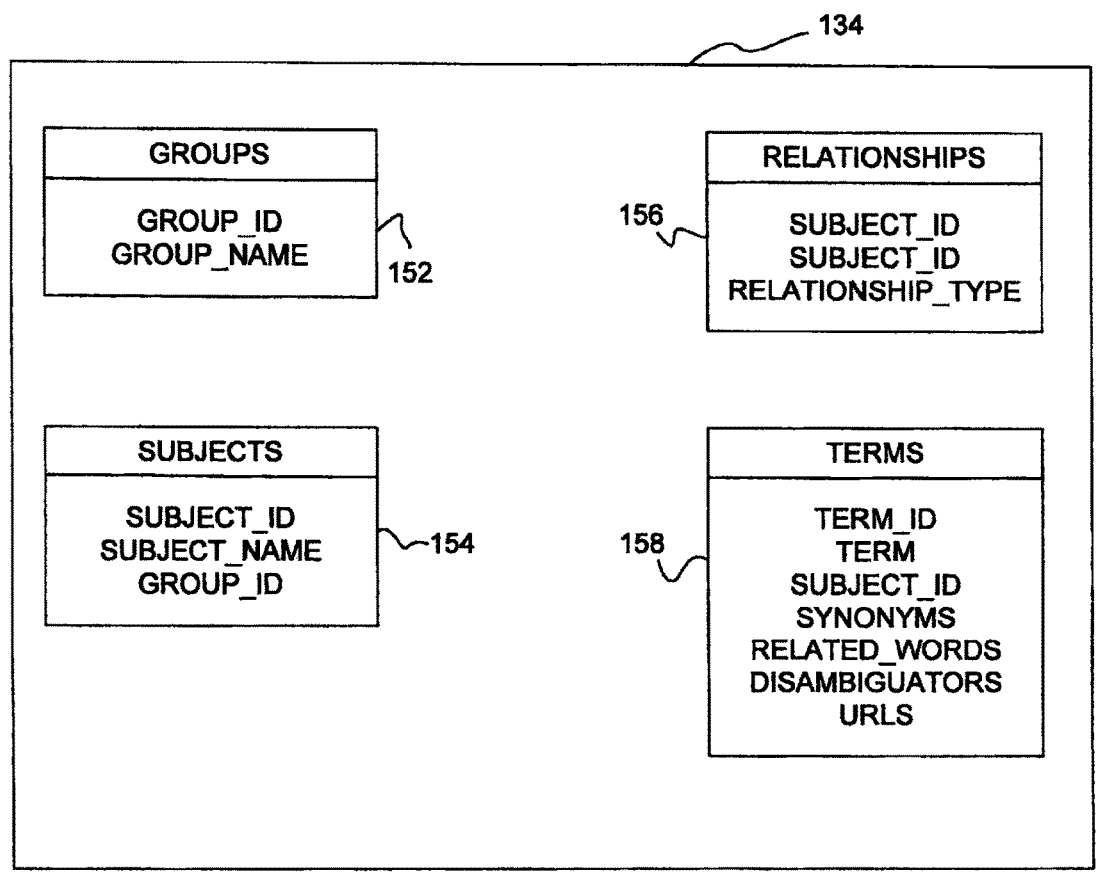

With reference to FIG. 1C, an example of portions of a database schema for the taxonomy database 134 is provided. The database schema includes various data tables such as, for example, a GROUPS table 152. The GROUPS table 152 includes a GROUP_ID field which stores a unique identifier for each group, and a GROUP_NAME field which provides the name of the group associated with GROUP_ID. Each group stored in the GROUPS table 152 may be related to certain top level topics or categories of data.

Each group stored in the GROUPS table 152 may have one or more subjects associated with it. These subjects may be stored in a SUBJECTS table 154. The SUBJECTS table 154 may include a data field SUBJECT_ID which stores a unique identifier for a subject record, and the SUBJECT_NAME associated therewith. Each subject record also includes a GROUP_ID field which stores data that indicates the group with which it is associated.

The subjects stored in the SUBJECTS table 154 may also be interrelated in a hierarchical form. For example, the "NEWS" group may have a "INTERNATIONAL NEWS" subject associated with it. The "INTERNATIONAL NEWS" subject may be broken down into more defined subjects such as "SOUTH AMERICA NEWS" or "AFRICA NEWS" for example. These relationships between the various subjects may be stored in a RELATIONSHIPS table 156. In the example provided, each record in the RELATIONSHIPS table 156 defines a relationship between two subjects. For example, the subject "INTERNATIONAL NEWS" may be related to the subject "SOUTH AMERICA NEWS" as a "PARENT" relationship indicating that "SOUTH AMERICA NEWS" comprises a subset of "INTERNATIONAL NEWS". Defining these types of relationships allow for a user to drill down through the taxonomy to further narrow their subject matter of interest within the system 101.

Also included in the database scheme is a TERMS table 158. Each record stored in the TERMS table 158 represents a term which is converted to a hypertext link when it appears in the content of a page generated by the publishing module 112. Each term record includes a unique identifier field TERM_ID which is a value unique to that term. The TERM record also includes a TERM field which stores the text of the term itself. Term records also include fields for storing other data related to the term. For example, the TERMS table 158 includes various additional data fields in which synonyms, disambiguators, and other related words and phrases may be stored to provide an indication of the context in which a term may be utilized. A disambiguator is a word or phrase which is likely to appear with the term depending on its context. For example, the term "Eagles" may have various meanings such as "Eagles" the football team, "Eagles" the rock band, or "Eagles" the bird itself. When used in the context of a football team, it is likely that the word "football" will appear in the same content as the term "Eagles". Similarly, if the term "Eagles" is used to reference the rock band, it may be likely to appear near the word "music". Thus, these words may be added to the term record as disambiguators which help the system to determine the context of a particular usage of the term (as is discussed in detail below in connection with FIG. 11A-11C). In addition, a data field may also be provide which includes URLs for data that is relevant to the term. The URLs may point to HTML pages, image files, videos, or some other types of data.

Figure 1D:
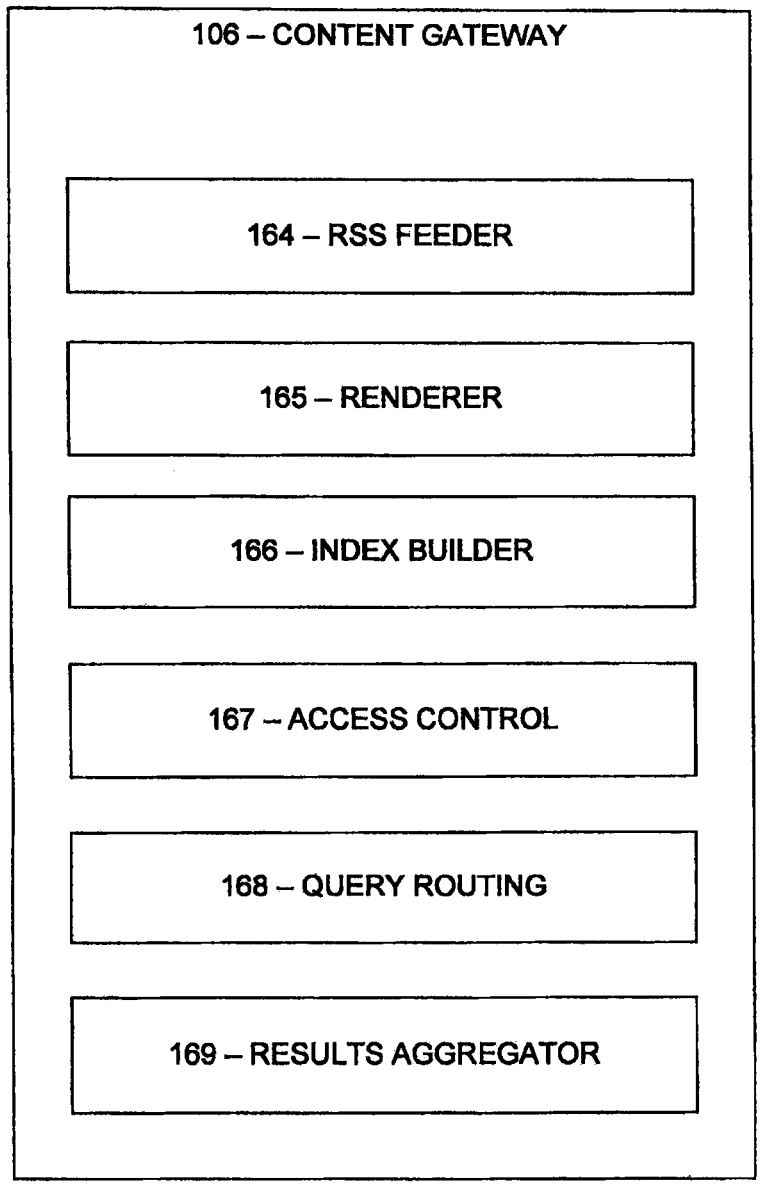

FIG. 1D provides a more detailed view of various sub-modules that may form portions of the content gateway 106. The content gateway 106 may be configured to process RSS feeds, ATOM feeds, and/or some other type of web feed. In one embodiment, the content gateway 106 may include a RSS feeder 164 which is configured to receive syndicated network content and pass it to a rendering module 165. The rendering module 165 is configured to take the syndicated content and format it for display on the computing devices 128. The content gateway 106 may further include an index builder 166. The index builder 166 is configured to generate an index of the content made available to the content gateway 106 via the WAN 102 and the proprietary content 104. The content gateway 106 may further include an access control component 167. The access control component 167 provides application level control of access and logging to the data made available to the content gateway 106. In some embodiments, the access control component 167 is used to restrict the publishing module's 112 access to content based on contractual agreements with content providers.

The content gateway 106 may further include a query routing module 168. The query routing module 168 is typically configured to receive query request from the client computers 128 and route the query to several parallel systems and content sources (in the WAN 102 and the proprietary content 104) simultaneously. This allows a single query request to be managed by the content gateway 106 to request and retrieve data from many different sources in a manner that is transparent to the user. The results received from the various queried content sources may be then compiled into a single results set by a results aggregator 169. The results set is then provided to the publishing module 112 where it is formatted appropriately and returned to the requesting client computer 128. In addition, the data returned to the content gateway 106 in response to queries sent by the query routing module 168 may be reformatted by the renderer 165 into a display format to suit the capabilities of the client computer 128 making the request. These display formats may include XML, SXML, RSS, ATOM, JSON, CSV, or some other format.

The various modules shown in FIGS. 1A-1D may be implemented as executable code modules that run on one or more general purpose computers or processors, including computers or processors that are geographically remote from each other. The executable code modules may be stored on any type of computer-readable medium or computer storage device.

Figure 2:
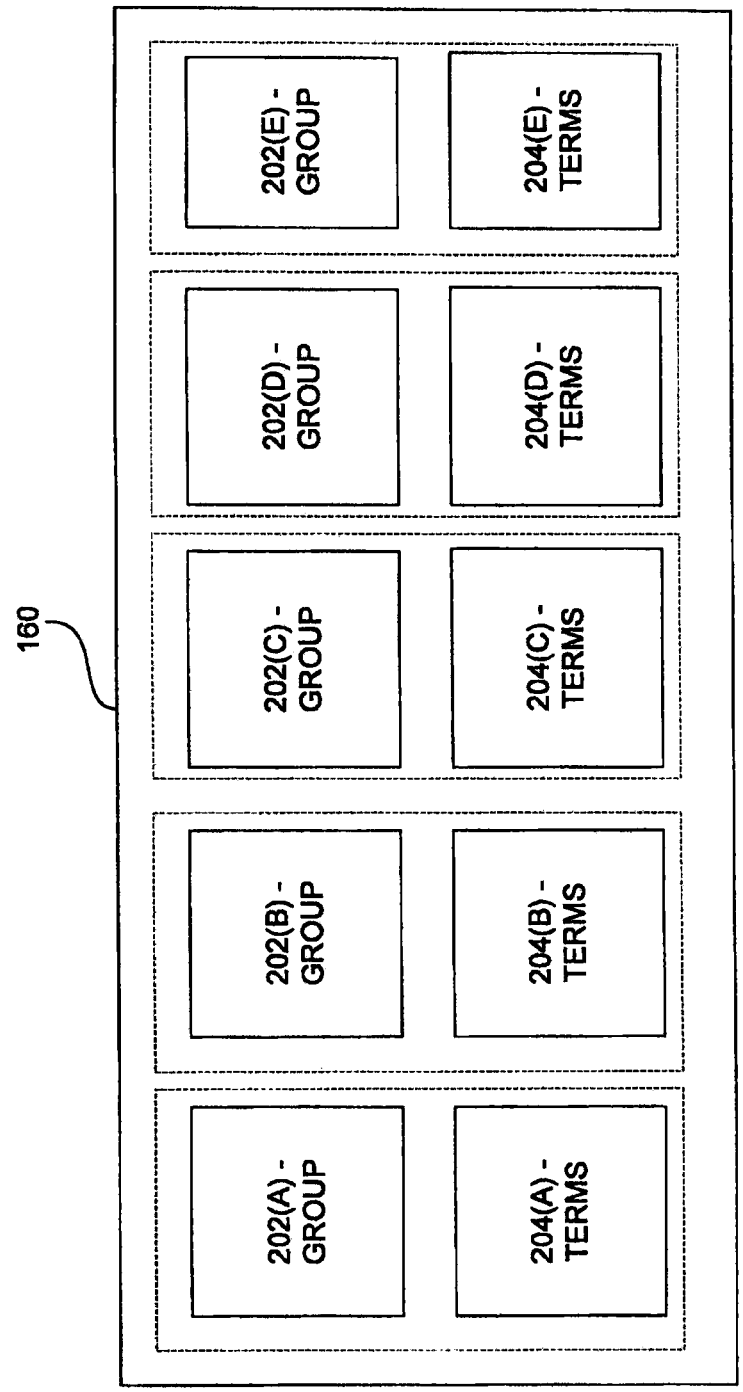
FIG. 2 is a block diagram illustrating how the taxonomy data from FIG. 1 may be indexed.

Referring now to FIG. 2, an example of how the database 134 in the taxonomy module 122 may be indexed for quick search capability is provided. As shown in the figure, the database 134 of the taxonomy module 122 may include one or more groups 202. As noted above, the groups 202 may be related to certain topics or categories of data. For example, one group such as group 202(A) may represent "News", while another group 202(B) may represent "Music". Other groups 202 may include "Sports" 202(C), "Showbiz" 202(D), "Business" 202(E). Other groups 202 may also be included in the taxonomy module 112. Each group 202 may have an associated set of terms 204. For example, the "News" group 202(A) may have a set of terms 204(A) which include keywords and concepts which are related to the news and deemed meaningful enough that a user may wish to access content specifically related to the keyword or concept. Similarly, other groups may also have associated sets of terms 204. For example, the "Sports" group 202(C) may include a set of terms which comprises meaningful concepts related to sports. The sets of terms 204 may be managed by a content management module. There may be hundreds of thousands, or even millions of search terms stored in the taxonomy module 122. In some embodiments, users of the computing devices 128 which access the dynamically generated content may suggest terms (e.g., specific words or phrases) to be added to one or more of the sets of terms 204 in the taxonomy module 112. As new terms, relationships, synonyms, and abbreviations are identified, the overall taxonomy may continuously evolve to include these identified items. The most popular terms, newest terms, and other useful sets of terms may be presented to the user in the form of "tag-clouds". A tag cloud is any visual representation of related words, which provides visual cues to the relative rank and popularity of the related words.

The HTTP service 118 in the dynamic content generation system 101 delivers web pages to the computing devices 128. As noted above, the pages delivered by the HTTP service may be dynamically generated from RSS content and/or other dynamic content which is received and processed by the content gateway 106 and further processed by the publishing module 112 into a delivery package which is simple to navigate using devices 128 having limited pixel space and/or keyboarding capability.

Figure 3:
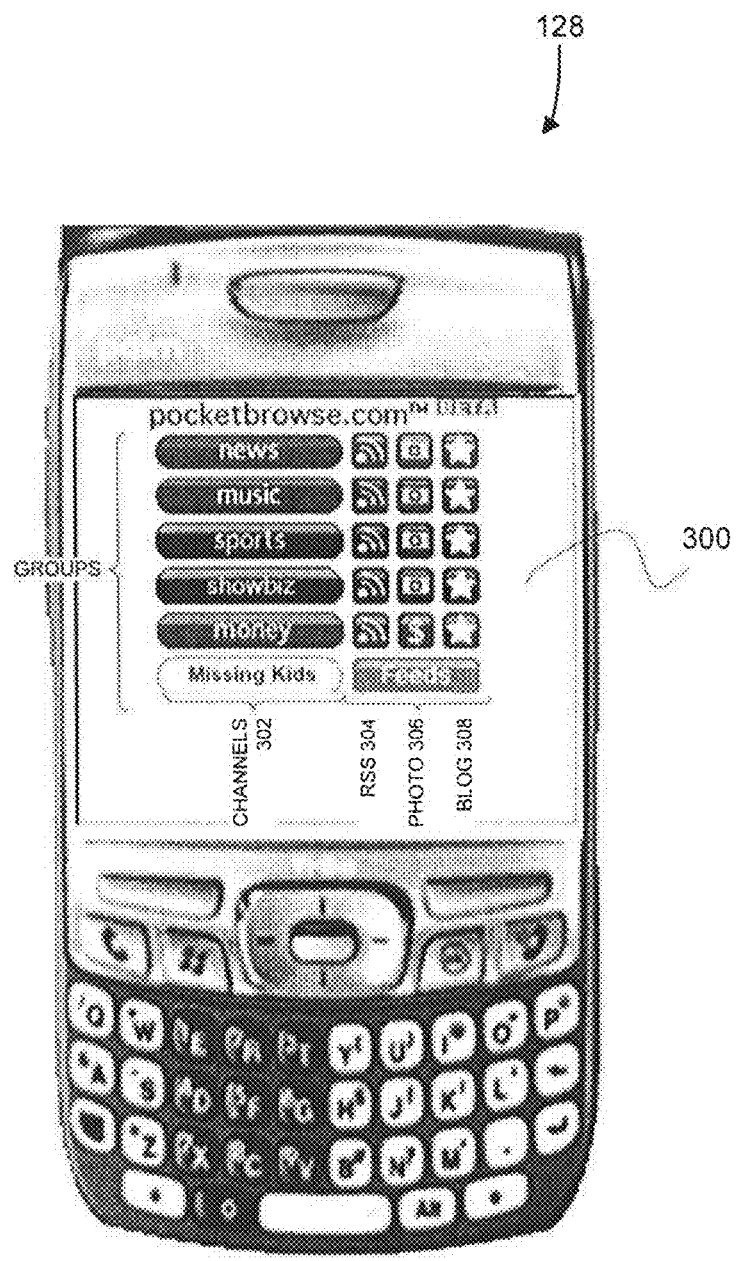
FIG. 3 is an example of a menu for receiving user requests for dynamically generated content related to groups in accordance with one or more embodiments.

FIGS. 3-8 generally provide an illustration of how the dynamic content generation system 101 delivers page data to computing devices 128. In the particular embodiments described with reference to FIGS. 3-8, the computing device is a limited form-factor handheld computing device 128. With particular reference to FIG. 3, an example of an entry page 300 for the dynamic content generation system 101 is provided. The entry page 300 includes hyperlinks associated which each of the groups 202. In the example provided, the groups include "News", "Music", "Sports", "Showbiz", "Money", and "Missing Kids." Each group 202 represented in the entry page 300 has four associated hyperlinks or buttons which serves as entry points into the system browsing experience. The first button for each group 202 is a channel button 302. The channel button 302 may provide a link to dynamically generated page content provided by a data source such as a syndication gateway or RSS feed. Selecting one of the channel buttons 302 sends a browser request for a web page having information generally related its associated group 202. For example, in response to a user selecting the "Music" channel the system 101 may query the syndicated content in the content gateway 106 for content related to music. This initial query can be implemented, for example, by querying on the term "music" or alternatively on one or more manually or automatically generated terms that are configured to produce results related to the topic of music. The content received as the query result is then processed by the filter module 114 and the enhancement module 116 and delivered back to the requesting device 128. When the user selects the channel button 302 for the news group 202, a request is generated within the system 101 and passed to the content gateway 106. The content gateway 106 retrieves the requested data using the RSS reader 108 and formats it for display using the rendering module 110. The formatted page data is delivered to the publishing module 112 and sent to the computing device 128 by the HTTP service 118. Similarly, a user may select a RSS button 304 which delivers RSS content, the photo button 306 which delivers image content, and the blog button 308 which delivers blog related content in response to the user's request. In each case, these data sources, document formats, and content types have relevant filters, and enhancements appropriate to that data. Although these are specific examples of subsets of available data, it will be appreciated that other subsets of available data may be added to the interface as these subsets become available.

Figure 4:
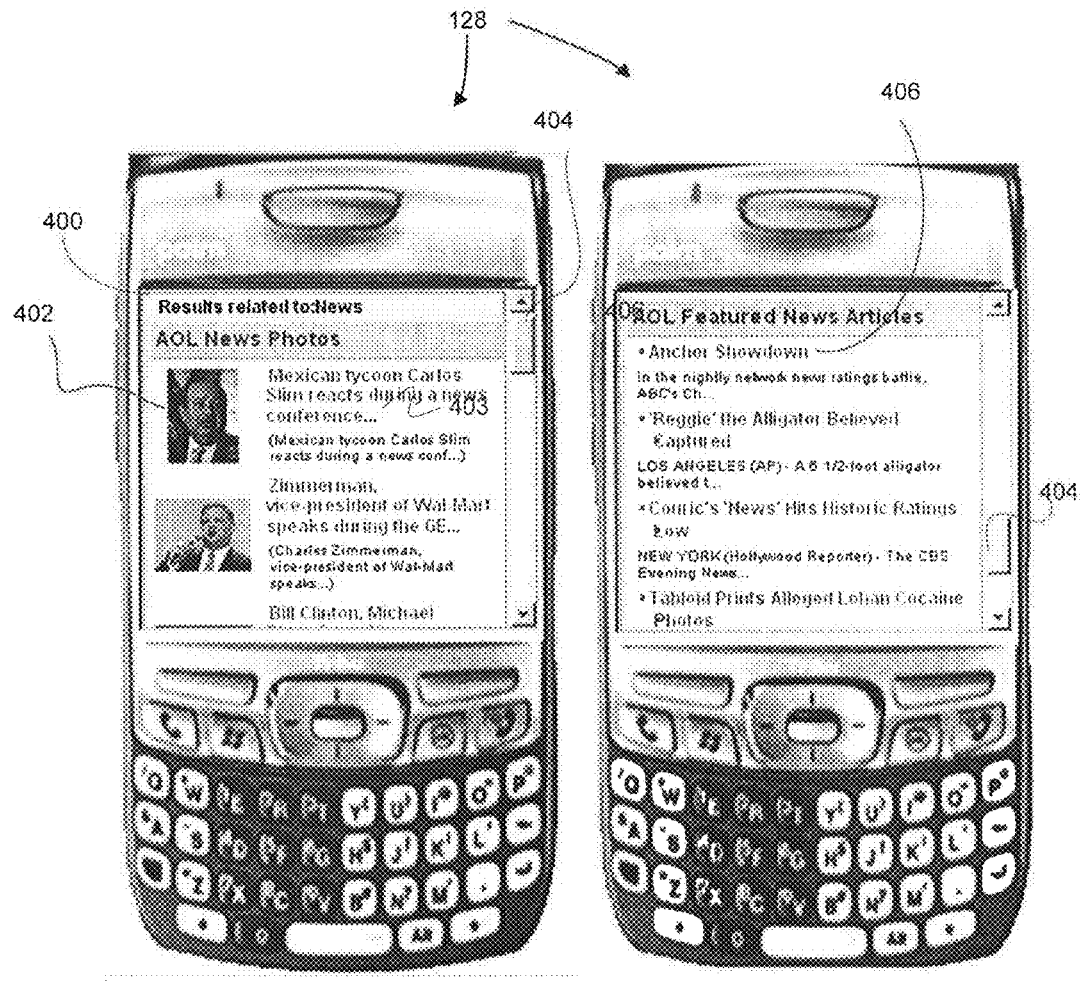
FIG. 4 is an example of content that may be presented when a user selects a channel associated with a group.

Moving now to FIG. 4, an example is provided which shows a page which is returned to the computing device 128 when a user selects the channel button 302 for the "News" group 202 in FIG. 3. Because the page returned to the computing device 128 extends beyond the vertical length of the device display, two separate screen shots are provided in FIG. 4 to show the different types of content that may be included in the returned web page. The displayed content in FIG. 4 provides an indication of the results type 400. In the example provided in FIG. 4, the user has selected the channel button for the "News" group. As a result, the result type 400 is "related to: News." As noted above the RSS reader aggregates content from various sources both over the Internet 102 and within the proprietary content 104 into a single page of results to deliver to the user. The aggregated content may include images such as image 402 with an associated caption 403 or story headline. Also included in the generated page may be news headlines 406 which also serve as hypertext links to the associated article. An example of these news headlines 406 and associated hyperlinks is provided in the right side display shown in FIG. 4. The images 402 (which are typically delivered as thumbnail images) may be hyperlinked. A user may select any of the images 402 or links 403. If the user wishes to read the entire news story behind the headline 406, they may select the headline (which is also a hypertext link) in order to read the entire news article.

Because the news articles are aggregated from different sources, selection of a news article link may require the content gateway 106 (or some other component of the system 101) to download the entire news article page from its syndication source. However, the syndication source may be a website which does not publish content for mobile devices. Thus, if the page is delivered to the handheld device 128, it may not display properly due to limitations in devices ability to handle more complex and rich HTML or XHTML, as well as the inclusion of unsupported enhancements, such as FLASH. To prevent the returned page from displaying incorrectly, the filter module 114 filters the web page appropriately and the enhancement module 116 adds hyperlinks to all terms in the web page which are in the set of terms 204 for the group 202. Once the filtering and enhancement is completed, the page is then delivered to the device 128. (This process is discussed in further detail below in connection with FIGS. 10 and 12 below.)

Figure 5A:
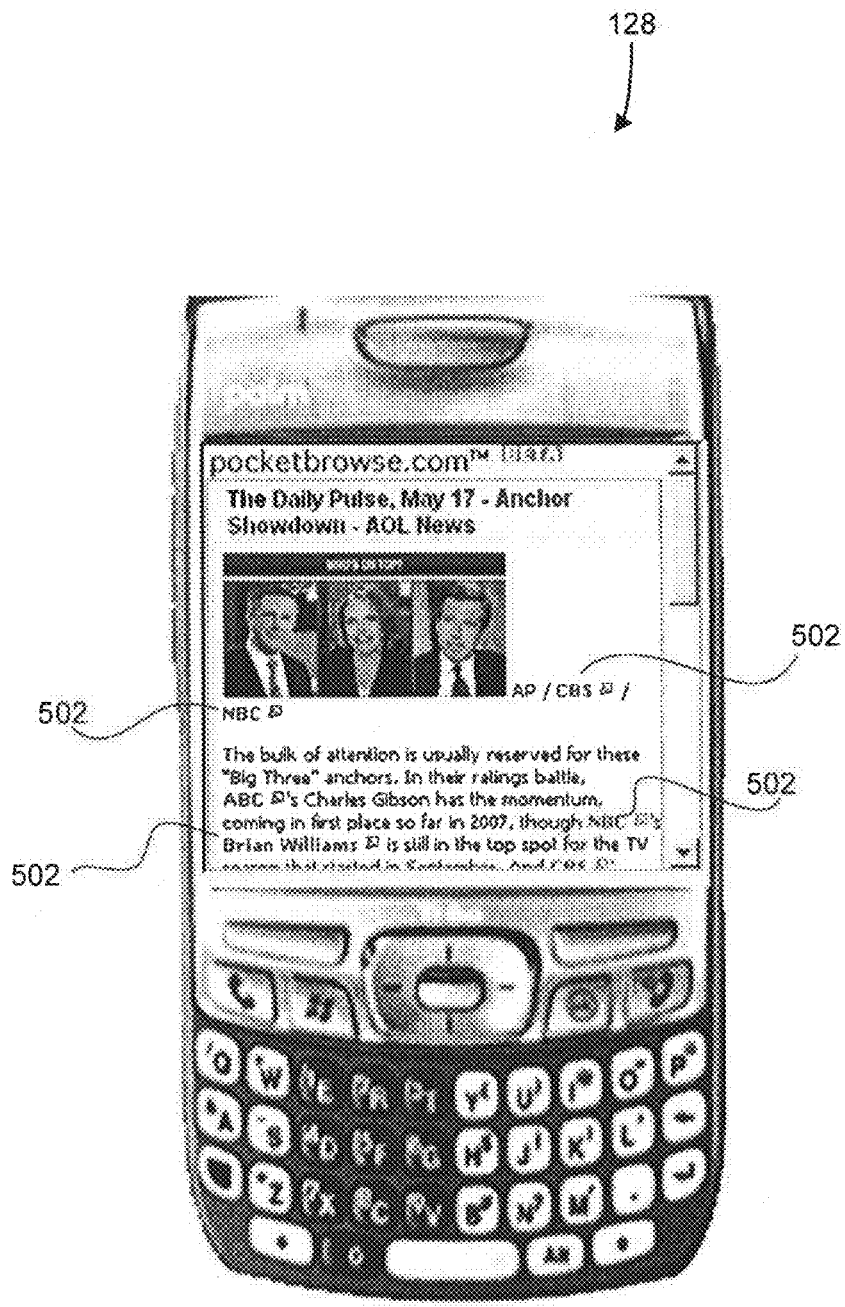
FIG. 5A is an example of a page which is dynamically generated based upon content shown in FIG. 5B.
Figure 5B:
FIG. 5B is the page from FIG. 5A in its original unmodified format.

FIG. 5A shows the display on the computing device 128 after the user has selected the headline 406 from FIG. 4 and the page has been filtered and enhanced. As shown in the figure, the image file associated with the news article has been reduced for improved display on the mobile device. Moreover, various terms 204 in the news article have been converted into hyperlinks 502 because the enhancement module 116 located the terms in the set of terms 204 relevant to the "News" group. The hypertext links 502 are highlighted by the upward/diagonal arrow set beside them. Clicking on any of the hyperlinks 502 may result in the system 101 performing a search for data related to the term associated with hyperlink (as will be discussed below). In some embodiments, the caching module 124 may have already performed the search in advance. In the specific example of FIG. 5A, the terms "NBC", "CBS", "ABC", and "Brian Williams" have been converted into hypertext links 204 by the enhancement module 118. Moreover, hyperlinks in the original content which link to external websites may have been removed from the displayed content by the filtering module 114. FIG. 5B shows an example of an unfiltered, unenhanced version of the web page shown in FIG. 5A. In the unadulterated version of the web page, the image file is considerable larger and none of the terms 204 from FIG. 5A are hypertext links. Moreover, much of the extraneous content such as advertisements and other rich media content has been removed.

Figure 6:
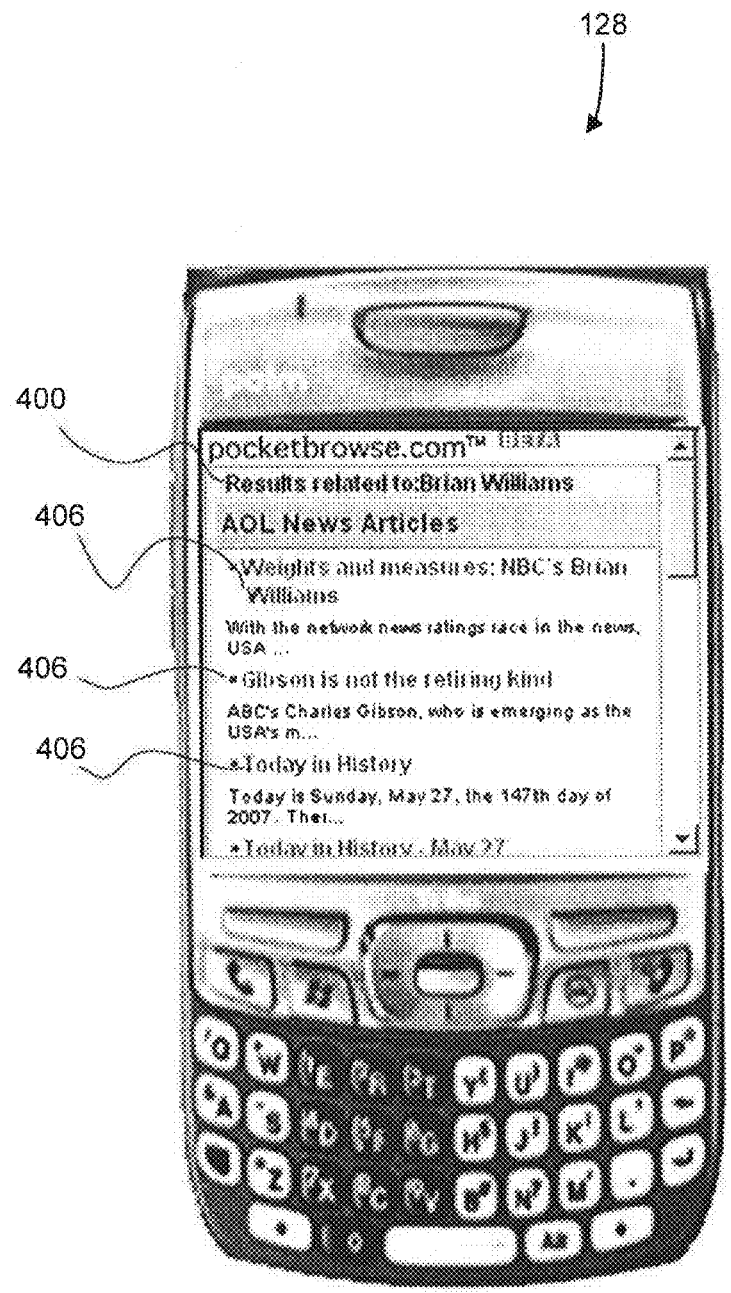
FIG. 6 is an example of dynamically generated content which is created based on a user selection of a generated taxonomy link.

Each of the hyperlinks 502 from FIG. 5A provides the user with an opportunity to access content related to the term 204 associated with each hyperlink 502. FIG. 6 provides an illustration of content which is provided to the mobile device 128 in response to the user selecting the hyperlink 502 "Brian Williams" from FIG. 5A. As shown in FIG. 6, a list of news headlines 406 related to "Brian Williams" is displayed to the user. The results type 400 indicates that the search results relate to "Brian Williams." Each of the news headlines 406 is also a hyperlink to a news story. If the user selects one of the headline hypertext links 406, the associated news story is then displayed in the same manner that the news story was displayed in FIG. 5A.

In certain embodiments, the content generation system 101 may be configured to provide a "self-contained" browsing experience to the user. A self-contained browsing experience is one in which all of the linked pages are within the same web site, although at least some of the content being viewed is extracted from other web sites. This type of browsing experience may be advantageous because it keeps users within the web domain of the system 101 and improves the level of user engagement, thereby increasing traffic within the site. Increased traffic may provide increased revenue to the service provider. In providing a self-contained browsing experience, the filter 114 of the publishing module 112 may optionally remove links to external websites so that all page links remain within the web domain. In some embodiments, the web links may be selectively removed, while in other embodiments, all external web links are filtered.

Figure 7:
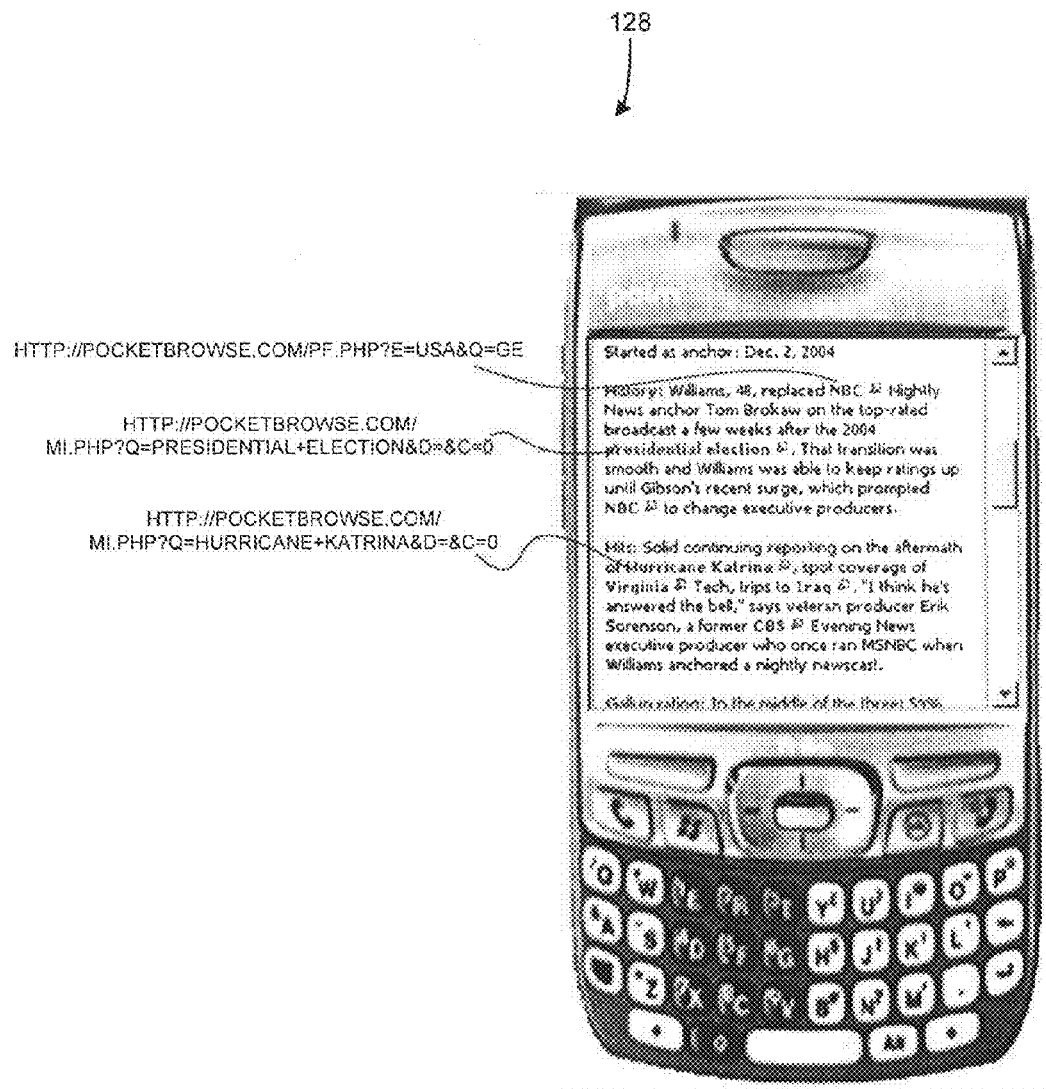
FIG. 7 is a chart showing the URL strings for various buttons and entry points to a self-contained browsing experience.

FIG. 7 provides an illustration of the how a self-contained browsing experience may be implemented by the dynamic content generation system. FIG. 7 shows an example of a news article linked to by one of the news headlines from FIG. 6. As with the news article from FIG. 5, certain terms in the article have been converted to hypertext links based on their presence in the set of terms 204 for group 202 in the taxonomy module 122. In this example, the domain of the website providing the service to the user is "pocketbrowse.com". Each hypertext link provided in the news story includes the "pocketbrowse.com" domain followed by a HTTP query string. Selection of any of the hyperlinks in FIG. 7 generates a query similar to the query generated when one of the channel buttons, utilities, or RSS buttons from FIG. 3 is selected.

Figure 8A:
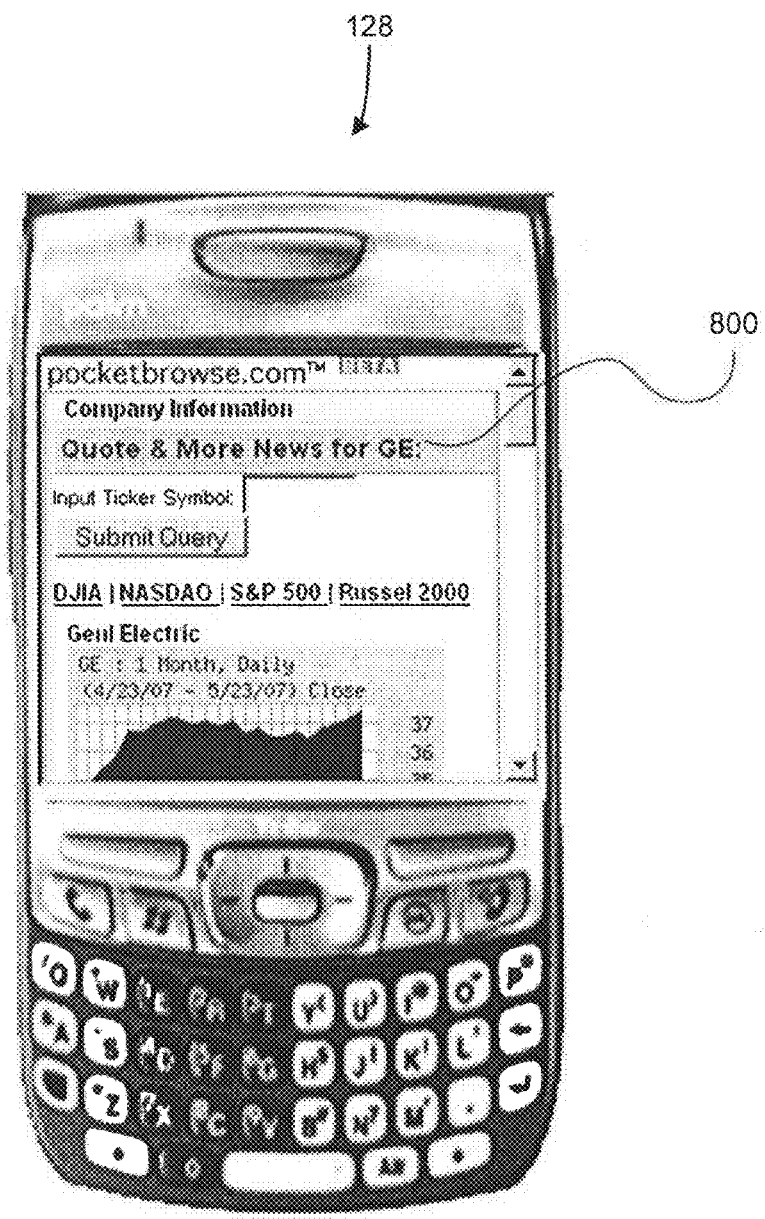
FIG. 8A is an example of how terms related to certain groups can generate different types of target pages.

In some embodiments, the sets of terms 204 for the groups 202 may be further categorized to provide specialized types of hypertext links. For example, if a term associated with a group relates to a company name, the generated hyperlink call a page which links to the company's financial data. FIG. 8A provides an illustration of a specialized type of hyperlink. In this example, the user has selected the hypertext link for the term "NBC" from FIG. 7, Because "NBC" is a subsidiary of "General Electric", the taxonomy module 122 is configured to associate NBC with General Electric. Referring back to FIG. 7, the associated hypertext link for "NBC" includes a different destination page and a different query string. This PHP script and query string retrieves a stock quote and company information for the ticker system GE and displays it on the mobile device 128 as shown in FIG. 8.

In other embodiments, different types of specialized hyperlinks may be created. For example, when a city name is among the set of terms 204 for a group 202, the associated hyperlink 506 direct the browser on the device 128 to a weather, maps, and/or traffic page or any other localized content (such as gas prices or movie theater locations) associated with that particular city.

Figure 8B:
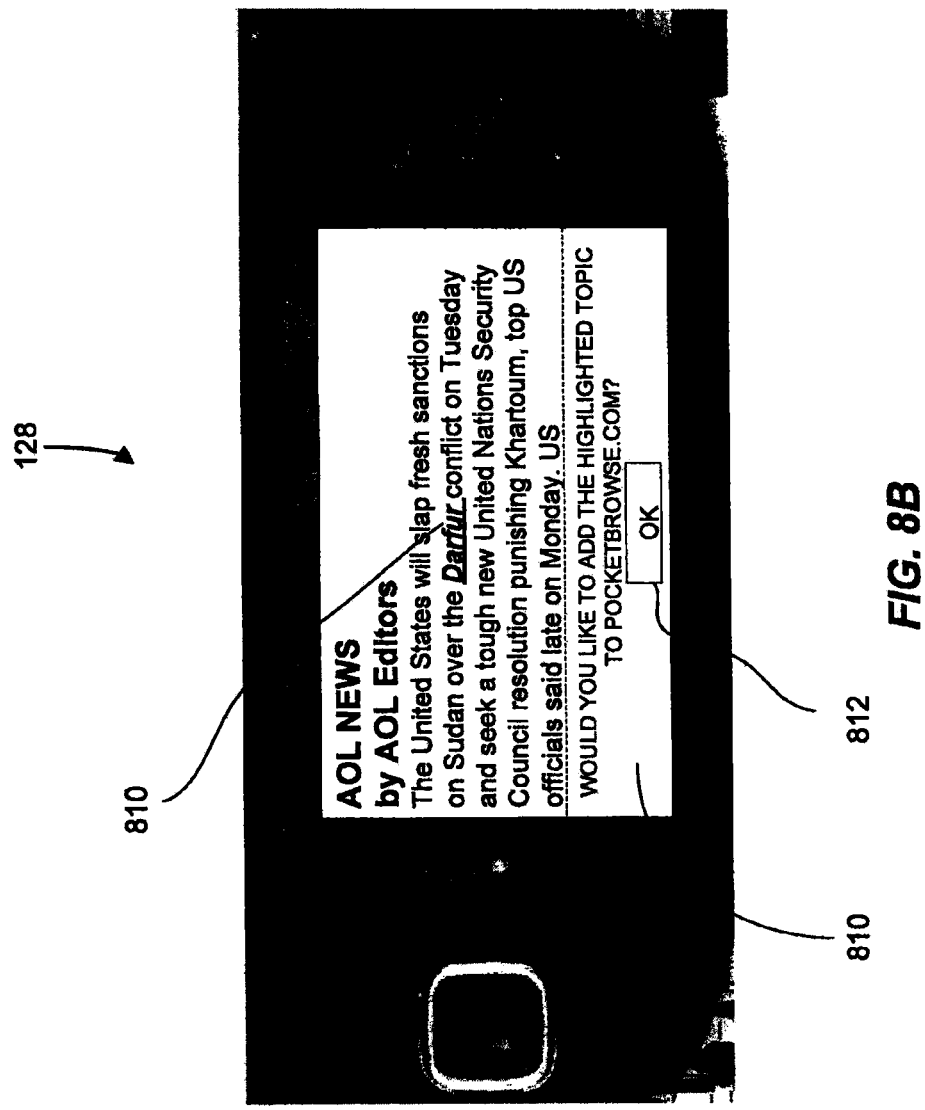
FIGS. 8B and 8C are examples of how users can request that terms be added to the taxonomy database from FIG. 1B
Figure 8C:
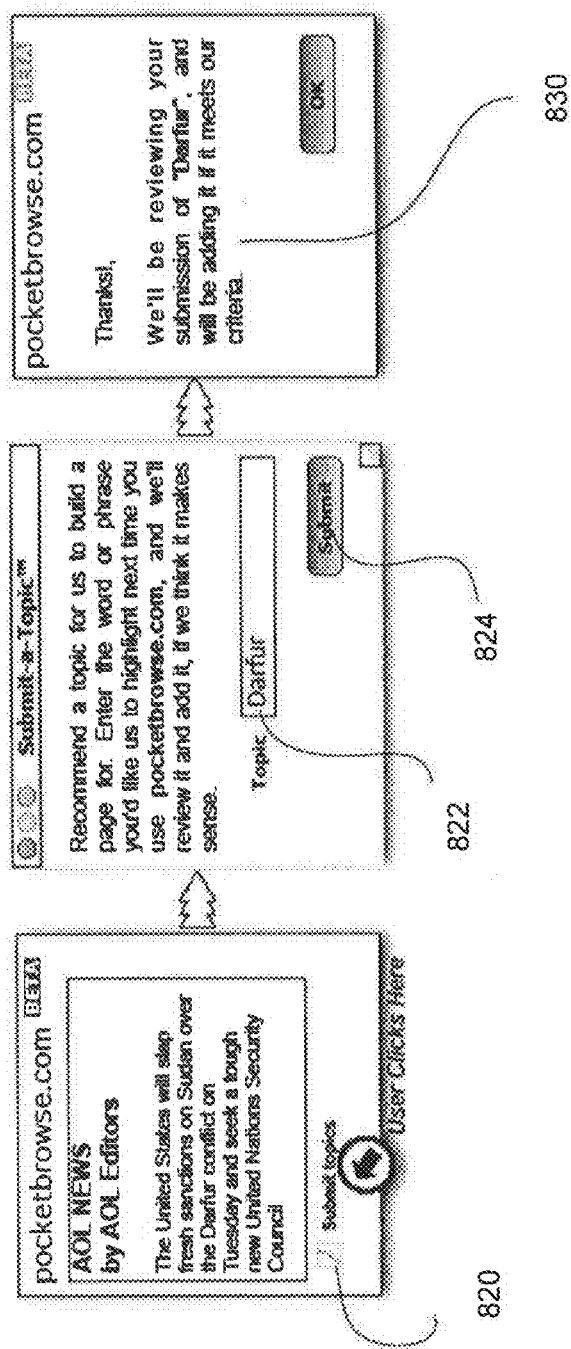

As noted above, certain aspects of the system 101 provide the ability for users of the client computer 128 to request that certain terms be added to the taxonomy database 134. FIGS. 8B and 8C are two example of user interfaces or requesting additional of a taxonomy term are provided. FIG. 8B shows a user interface on the client device 128. The user interface is displaying a news story. The term "Darfur" has been highlighted by the user. In response to the highlighting of the term, a control 810 is presented to the user which asks whether the highlighted term/topic should be added to the database. If the user selects "OK" 812, then a request is sent to the system to add the term to the taxonomy.

In some embodiments, the term may be automatically added to the database 134. In these embodiments, a primacy model allowing varying degrees of confidence in added terms may be utilized to police inappropriate submissions. For example, a term that has been added by administrative users of the system may have a high confidence ranking because its source can be easily verified. However, to ensure that inappropriate terms are not added and then displayed to other users, a term added to the database 134 via the interface shown in FIG. 8B may be given a low confidence ranking initially. Once the added term has been reviewed by the site administrators, its confidence ranking may be adjusted accordingly. In other embodiments, the user submission of a term is only a request, and the term is not added automatically to the database. In these embodiments, the administrative users of the taxonomy module 122 may review the request independently, and determine whether it should be added to the taxonomy.

Referring now to FIG. 8C, an alternative user interface on a client device 128 for providing a user the ability to request addition of a term to the taxonomy database 134 is provided. As shown in the figure, the first screen shot (on the left side) includes a checkbox control 820 which may be selected by the user. If the user selects the checkbox control 820, a second screen is displayed which allows for the input of a requested topic 822. Once the requested topic 822 has been input, the user may then select the "Submit" button 824. This selection sends the request to the system 101. Upon submission of the request, the confirmation notice 830 may be then presented to the user which confirms that their request has been received into the system. In still other embodiments, a control may be provided to a user which is a drag-and-drop control that enables the user to drag and drop a term to a particular display area which to cause the term to be submitted for nomination.

As discussed above, the dynamic content generation system 101 is configured to retrieve data from external sources and modify the data to be served via HTTP to client devices such as computer device 128. FIGS. 9-13 provide illustrative flowcharts describing various aspects of the page generation process.

Figure 9:
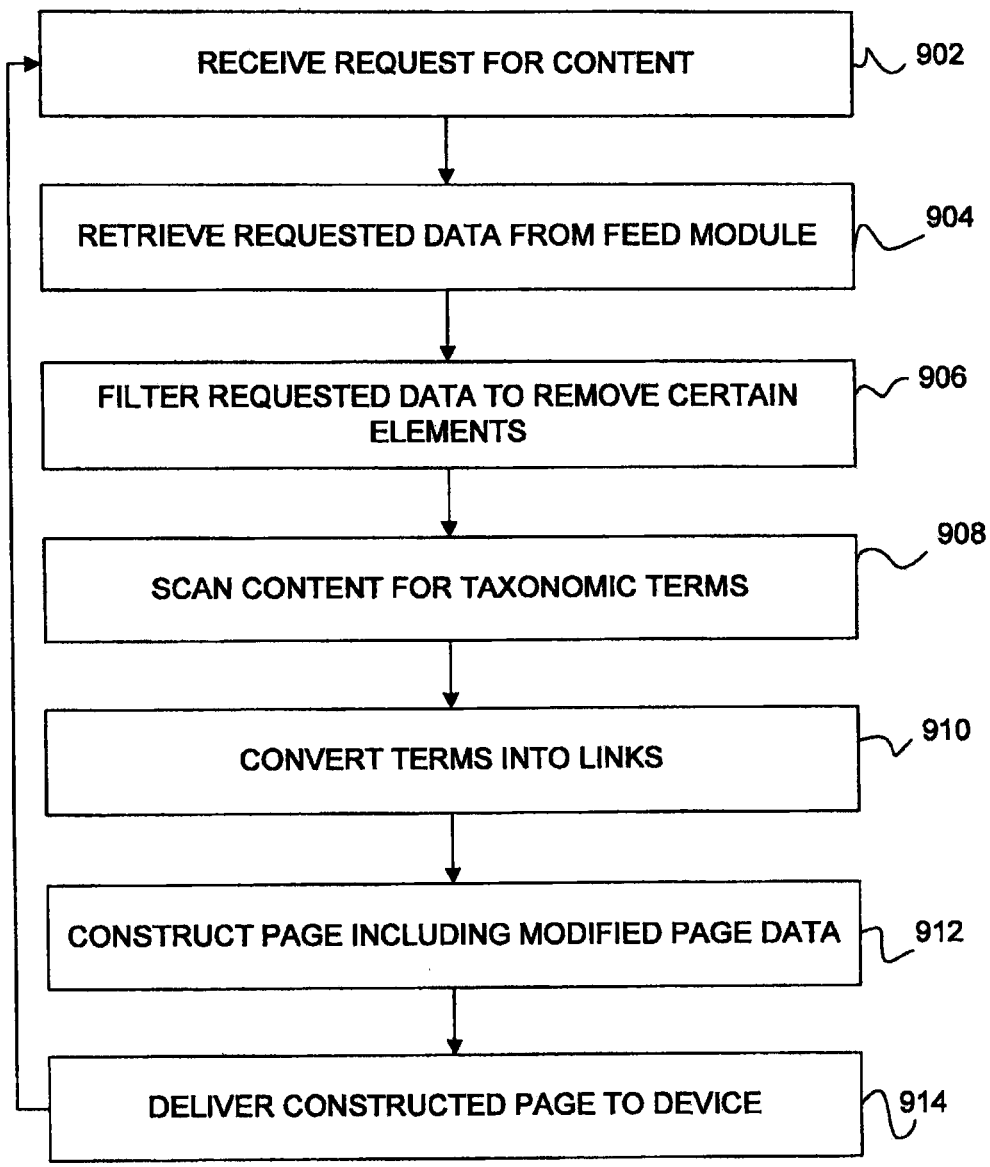
FIG. 9 is a flowchart of a dynamic page generation process according to one or more aspects.

FIG. 9 is a flow chart describing various aspects of a user request which occurs as a result of the selection of a channel button 302 or of any hypertext link. The process begins at block 902 where the user clicks the channel button hyperlink for one of the groups 202 or a hypertext link corresponding to one of the displayed terms 204. In response to the request, at block 904 the system 101 retrieves the requested page data from the content gateway 106. Next, at block 906, the retrieved data is passed to the publishing module 112 where the filtering module 114 removes those page elements which are not desired. As noted above, rich formatting and other types of advanced content may be filtered from the page content. Next, at block 908 the enhancement module 116 scans the filtered content for terms which are in set of terms 204 for the group 202 of the content. This enhancement module may identify the presence of terms 204 utilizing known search and matching methods. At block 910, the enhancement module converts each of the identified terms 204 into a hypertext link. Once the enhancement of the page is complete, the process moves to block 912, where the HTTP service 118 constructs the page including all of the modifications. Finally, at block 914, the constructed page is delivered to the client device 128. Upon the user selecting one of the hypertext links in the constructed page, the process returns to block 902.

Figure 10:
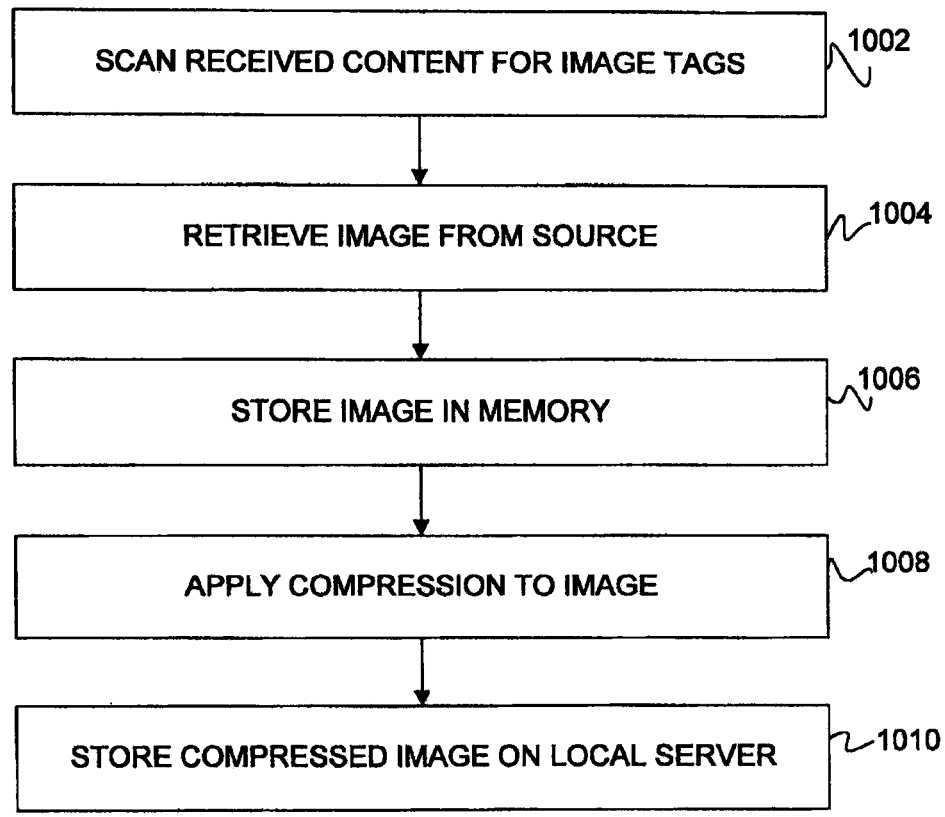
FIG. 10 is a flowchart showing how images from external content may be modified for display in the dynamically generated web pages.

As noted above, in some embodiments, the filtering module 114 may modify image content to be better displayed on small form-factor devices. FIG. 10 is a flowchart of one exemplary process for performing such modifications. The process begins at block 1002 where the filtering module 114 scans the page content and identifies an image included in the page based on the presence of image tags. Next, at block 1004, the filtering module retrieves the image from its original location (i.e. from the IMG_SRC). At block 1006, the filtering module 114 stores the image in a memory (on the HTTP server, for example), and a compression algorithm is applied to the image in block 1008. Next, at block 1010, the compressed image file is stored in a data storage area of the system 101 (or in a remote storage location accessible to the system 101). Once the compressed image has been stored, the page content is modified to refer to the URL of the compressed image rather than the source image at block 1012.

Figure 11A:
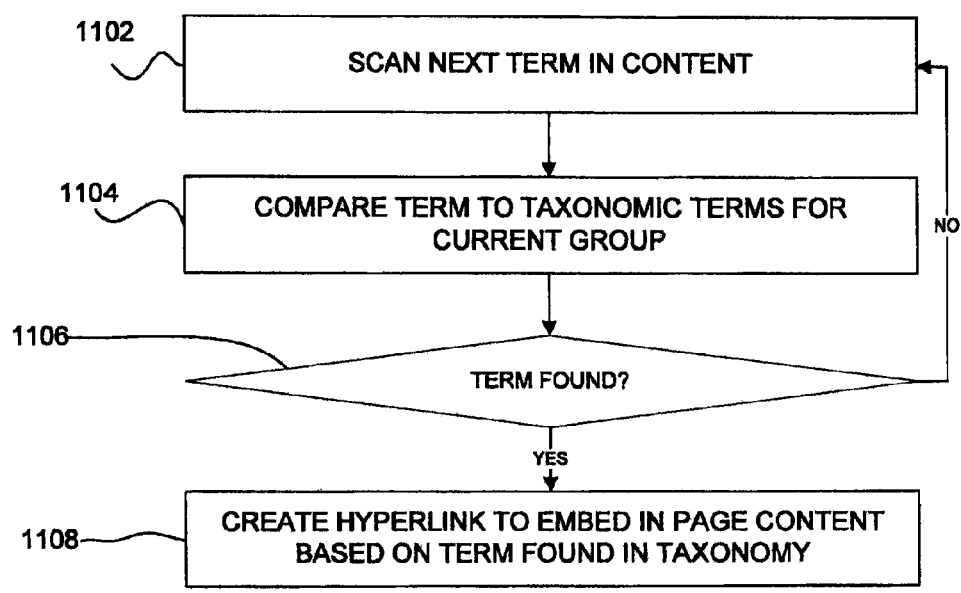
FIG. 11A is a flowchart of a process for inserting links into dynamically generated content based on the presence of certain terms within the content.

FIG. 11A is a flowchart describing how the enhancement module 116 utilizes the data from the taxonomy module 122 to create hypertext links to place within the requested page content. The process begins at block 1102 where the enhancement module reads into memory the next term in the content to the displayed. Next, at block 1104, the term in memory is compared to the set of terms 204 for the current group 200. Next, at decision block 1106, if the term is not found, the process returns to block 802 and the next term is scanned. If, however, the term is found within the set of terms 204 of the taxonomy module 122, a hyperlink is created for the term at block 1108. The hyperlink may include a query string having the term as a search parameter.

As noted above, terms stored in the taxonomy database 134 may have associated metadata which includes associated subject(s) and group for a particular term. Additionally, a term stored in the taxonomy database 134 may include disambiguators and/or alternative terms and phrases which may help to better define the entity referenced by the term. In some embodiments, this associated metadata may be used to refine searches based on the term so that the results are more relevant and accurate within the particular context in which the term appears. In particular, the metadata associated with the term may be used to further refine the search parameter embedded into the URL hyperlink. In one embodiment, the search parameter may be supplemented to include a disambiguator associated with the term. For example, consider the term "Eagles". As noted above, depending on the context, the term may have various meanings (e.g., a rock band, a bird, a football team). If the term appears in page content generated from the "Sports" group, it is likely that the use of the term in the page content is directed to the football team. However, if the term appears under the "News" category, it is possible that it could take any of the various meanings described above. For example, the content may be a news article on the Eagles band. Similarly, the content may be a news article on the Eagles football team, or about the bird itself. In these instances, the term metadata stored in the taxonomy database 134 may be used to determine the proper context for the search that occurs when a user selects the hypertext link.

Figure 11B:
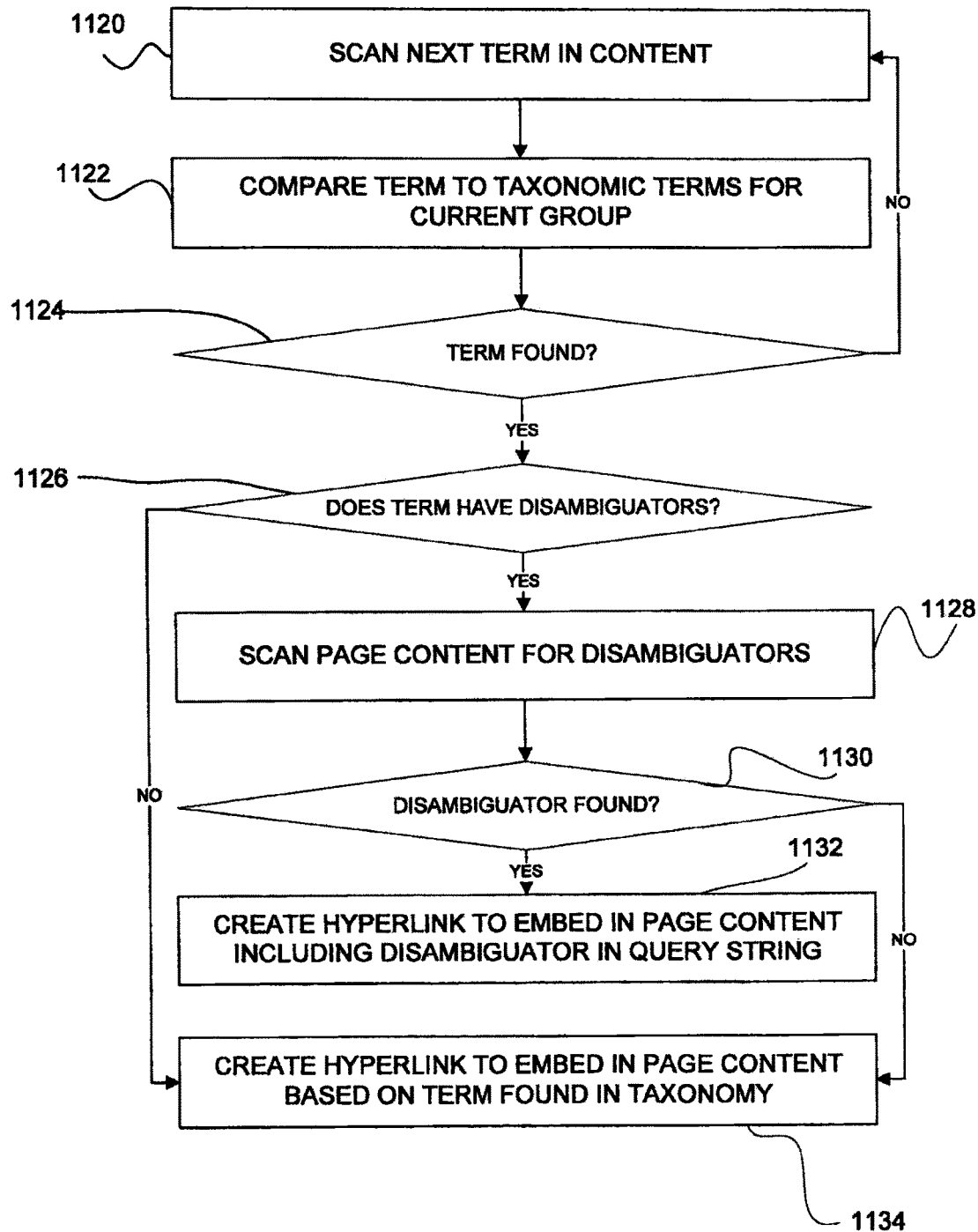
FIG. 11B is a flowchart of a process for using term metadata to refine a search based on the context of the term in page content.

Referring now to FIG. 11B, a flowchart of an exemplary process for determining the context of the term and creating the appropriate resultant query string for the term record as shown in FIG. 11C is provided. The process begins at block 1120 where the term (in this case "Eagles") is found in the page content. Next at block 1122, the term "Eagles" is compared to the index of terms 204 for the group 202 associated with the page content. At decision step 1124, if the term were not found in the taxonomy, the process would return to block 1120 to begin the process anew. If however, the term is found in the taxonomy database 134, the process moves to block 1126 where the term record is looked at to determine whether the term has any associated disambiguators. As discussed above, the disambiguators may be words that would be likely to appear with the term in a given context. If not, the process jumps to block 1134, where a hyperlink is created based only on the term itself.

The system scans the page content then checks to see if the term record in the database 134 includes any disambiguators. In the example provided by FIG. 11C, the term "Eagles" has three disambiguators: "Music"; "Football"; and "bird". As a result, the process moves to block 1128 where the page content is scanned for occurrences of any of the disambiguators. Next at decision block 1130, if one or more of the disambiguators is found in the page content, the system creates a hyperlink to embed in page content at block 1132. The hyperlink created at block 1132 includes the disambiguator in its associated query string. If none of the disambiguators is found within the content, then the process moves to block 1134 where the standard hypertext link is generated for the term.

To further illustrate how the process shown in FIG. 11B might work, consider an example in which the term "Football" is also found in the page content at block 1130. In that instance, the hypertext link generated may include a query string "Eagles+football" rather than simply "Eagles". The more detailed query string will help to eliminate results which are not relevant to the context in which the term appears in the page.

Figure 12:
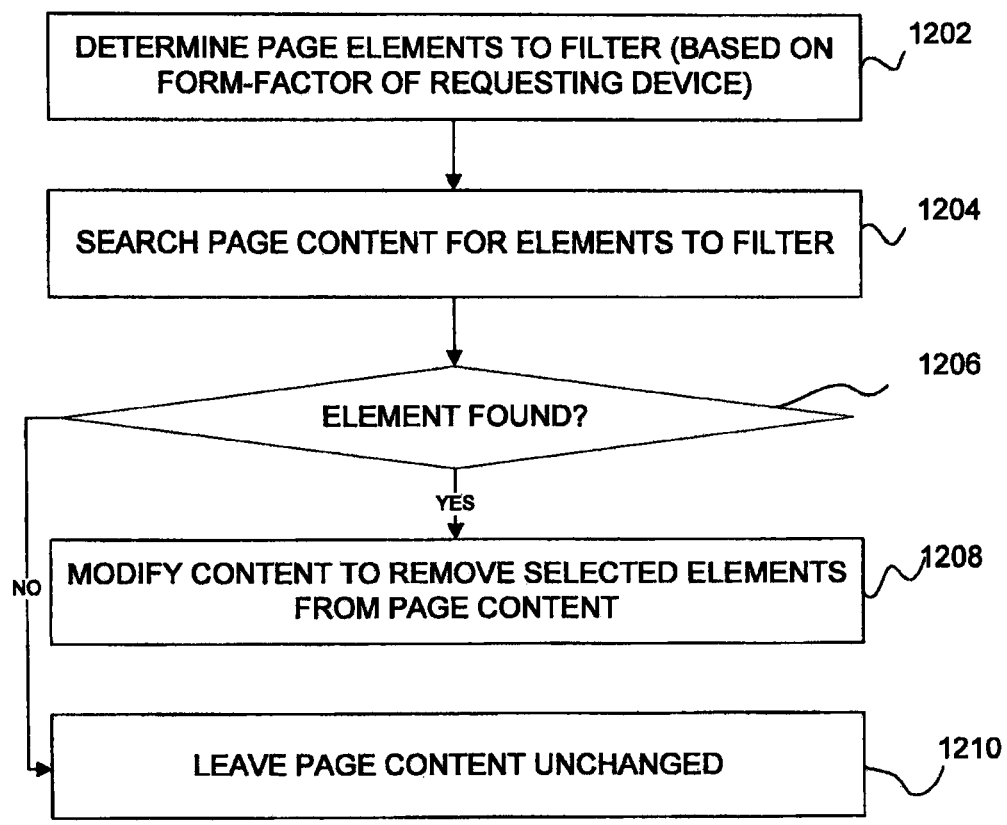
FIG. 12 is a flowchart of a page filtering process which removes certain elements from dynamically generated pages in accordance with certain embodiments.

Referring now to FIG. 12, a flow diagram of the filtering process described in FIGS. 5A and 5B is provided. The process begins at block 1202, where the filtering module 114 determines which page elements to be filtered from the page in memory. The filtering module may determine this based on the form-factor of the requesting device, the browser configuration of the device, or it may be hard coded into the filtering module 114. Next, at block 1204, the filtering module 114 scans the page content for the page elements to be filtered. The process then moves to decision block 1206 where the system 101 determines whether the page elements are present in the page content. If so, the process moves to block 908 where the content is modified by removing the selected elements from the page content. If at decision block 906 no page elements are found, the process moves to block 910 and the page content is modified.

Figure 13:
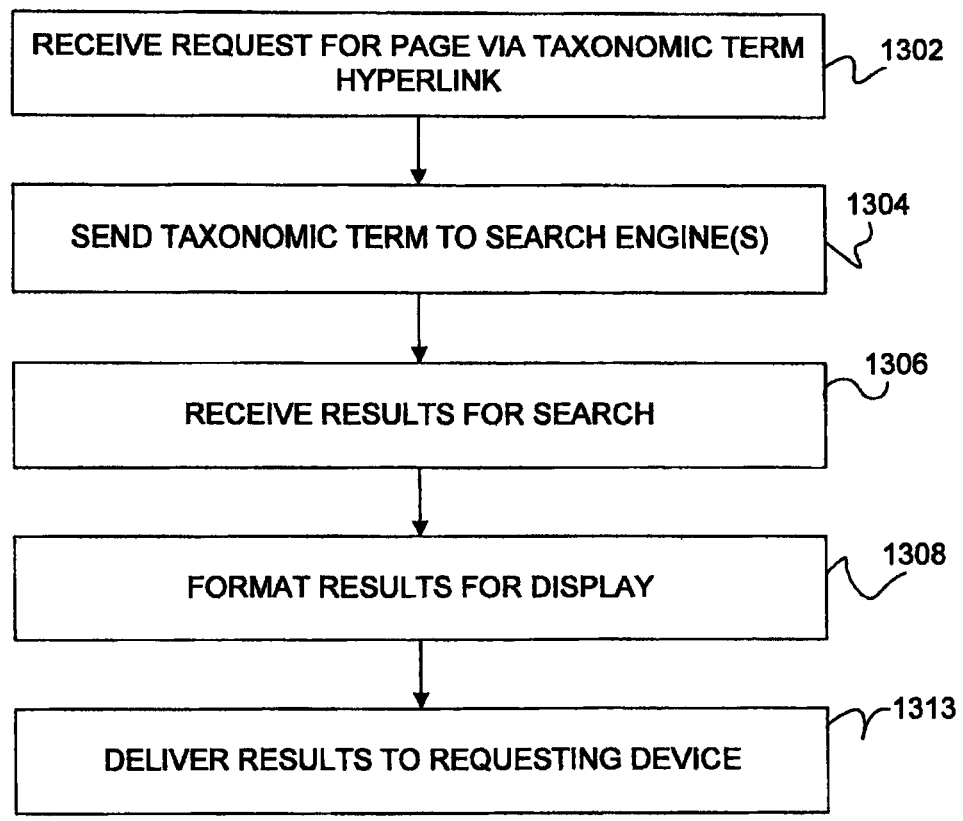
FIG. 13 is a flowchart of the process by which the system generates a page in response to a selection of a taxonomic hyperlink.

FIG. 13 provides a flowchart of a process by which a page may be dynamically generated from selecting a hyperlink 502 which represents a term 204 (such as that shown in FIG. 5A). The process begins at block 1302 where the user requests a page via a taxonomic term 204 hyperlink as shown in FIG. 5A and FIG. 7. Next, the term 204 is sent to a search engine at block 1304 using a query string such as those shown in FIG. 7. Next, at block 1306, the results are received from the search, and formatted for display on the device 128 at block 1308. Once the results have been properly formatted, the page may be delivered to the requesting device 128.

In one particular embodiment, a search based on a term in the taxonomy is limited based on its associated GROUP_ID in order to achieve the most relevant results.

Figure 14:
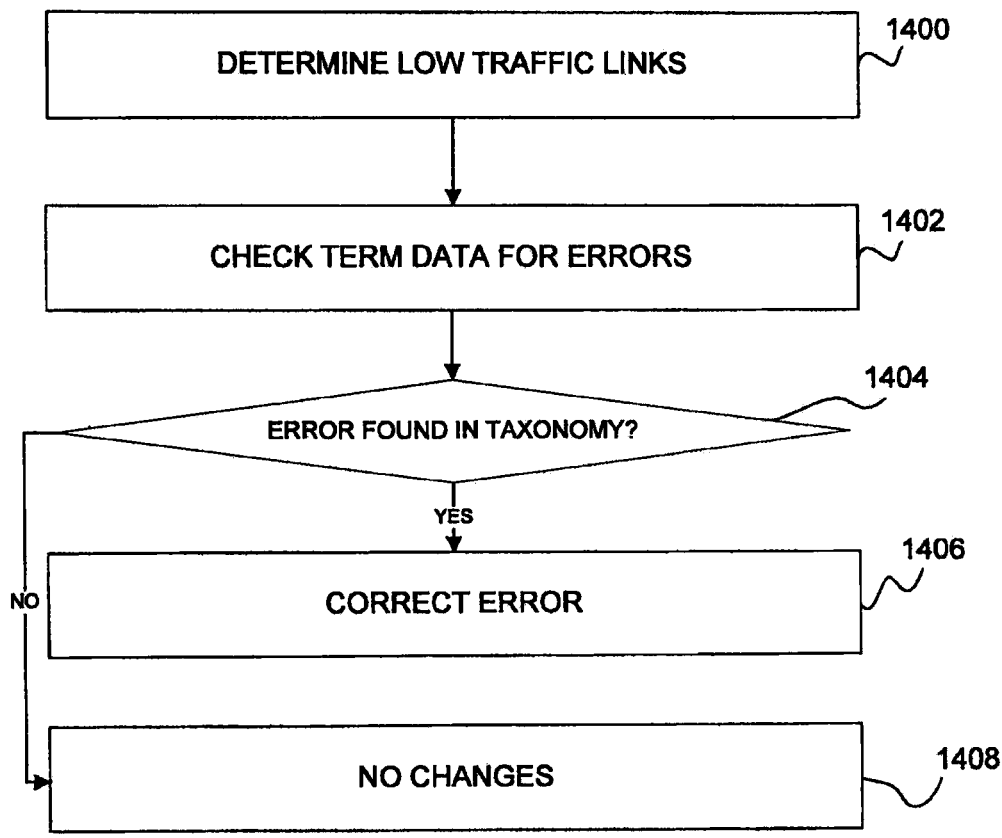
FIG. 14 is a flowchart of a process that may be used to identify inaccuracies or errors in the taxonomy.

As another example, the system may log each link selection event in which a user selects a term that has been transformed into a link. The system may also log associated link impression events, such that the system can calculate the click-through rate for each term. Terms with low click-through rates, or which lead to discontinued use of the system, may automatically be removed from the taxonomy. In some cases, if a term has a low click-through rate, it may be indicative of some defect in the taxonomy. For example, the term may be misspelled or miscategorized. In some embodiments, taxonomy administrators may be alerted to these low-traffic links so that they may be considered for modification or removal from the database 134. FIG. 14 provides an example flowchart of a process by which low-traffic links may be addressed.

The process begins at block 1400 where the system 101 identifies the low-traffic links. This identification may be provided by commercial web statistics tracking software, or by some custom made software which analyzes the HTTP server 118 logs. Next, at block 1402 the term associated with the link may be checked for errors. These errors may include spelling errors in the record data, improper placement within the taxonomy, or some other error. The error checking may be automated (by an automated spell checker, for example), or it may be done by a human editor. Next at decision block 1404, if an error was found in the taxonomy, the process moves to block 1408 and no changes are made. If, however, an error is identified, the process moves to block 1406 where the error is corrected in the taxonomy database 134.

Figure 15:
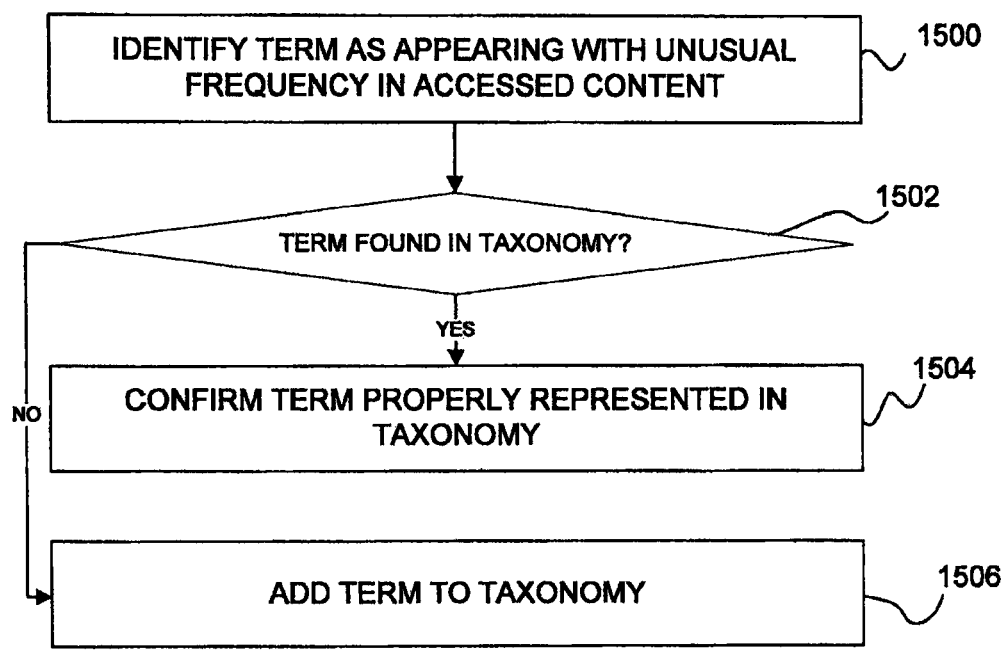
FIG. 15 is a flowchart of an automated process for adding terms to the taxonomy database.

The disclosed system may further include one or more features for automatically refining the taxonomy over time, and/or for collecting data that is useful to administrators in refining the taxonomy. As one example, the system may continually analyze RSS fees, news sites, blogs, social networking sites, and/or content sources to identify terms and topics that are rapidly gaining (or falling) in popularity. This information may in turn be used to automatically or manually add and remove terms and/or topics in the taxonomy. FIG. 15 provides an example of how the taxonomy may be automatically refined based on the popularity of terms. The process begins at block 1500 where in the system identifies a terms as appearing with unusual frequency. Like with the process described in connection with FIG. 14, this functionality may be provided by off the shelf web statistics software or by customized software. Once a frequently appearing term is identified, it is checked against the taxonomy at decision step 1502. If found in the taxonomy, the term record is reviewed for accuracy at block 1504. If the term is not already stored in the taxonomy database 134, it is then added at block 1506. In some embodiments, the system may be further configured to analyze the surrounding page content for a term appearing with unusual frequency in the accessed content. If certain related words appear with the same frequency, they may be added to the term record as disambiguators.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A computer-implemented method of generating web pages, the method comprising the following operations performed by one or more processors:
   identifying a first term in a first web page;
   identifying metadata associated with the first term;
   identifying, in the first web page, at least one related word for the first term;
   generating a hyperlink that includes a query string associated with the first term, the identified metadata, and the at least one related word for the first term identified in the first web page, the hyperlink providing access to a second web page that comprises content items derived from search results using the query string;
   scanning the content items in the second web page to identify one or more second terms; and
   generating further hyperlinks for the one or more second terms in the second web page.

2. The method of claim 1, wherein the first web page contains textual content that is responsive to a request from a user computing device.

3. The method of claim 2, wherein the operations further comprise presenting the first web page to the user computing device.

4. The method of claim 1, wherein the operations further comprise generating the second web page by aggregating the content items derived from search results using the query, the content items being from one or more web sites.

5. The method of claim 1, wherein the operations further comprise generating the second web page by selecting a highly ranked subset of the content items to be included in the second web page.

6. The method of claim 1, wherein the operation of generating further hyperlinks for the one or more second terms in the second web page comprises creating links that point to the first web page.

7. The method of claim 1, wherein the operations further comprise finding the at least one related word in an index of terms, wherein the index of terms is part of a taxonomy database.

8. The method of claim 1, wherein the query comprises a string of text.

9. The method of claim 1, wherein the at least one related word is a disambiguator associated with the first term.

10. An apparatus for generating web pages, comprising:
    a storage device that stores a set of instructions; and
    at least one processor coupled to the storage device, the at least one processor being operative with the set of instructions in order to:
    identify a first term in a first web page;
    identify metadata associated with the first term;
    identify, in the first web page, at least one related word for the first term;
    generate a hyperlink that includes a query string associated with the first term, the identified metadata, and the at least one related word for the first term identified in the first web page, the hyperlink providing access to a second web page that comprises content items derived from search results using the query string;

scan the content items in the second web page to identify one or more second terms; and generate further hyperlinks for the one or more second terms in the second web page.

11. The apparatus of claim 10, wherein the first web page contains textual content that is responsive to a request from a user computing device.

12. The apparatus of claim 11, wherein the at least one processor is further operative with the set of instructions to present the first web page to the user computing device.

13. The apparatus of claim 10, wherein the at least one processor is further operative with the set of instructions to generate the second web page by aggregating the content items derived from search results using the query, the content items being from one or more web sites.

14. The apparatus of claim 10, wherein the at least one processor is further operative with the set of instructions to generate the second web page by selecting a highly ranked subset of the content items to be included in the second web page.

15. The apparatus of claim 10, wherein generating further hyperlinks for the one or more second terms in the second web page comprises creating links that point to the first web page.

16. The apparatus of claim 10, wherein the at least one processor is further operative with the set of instructions to find the at least one related word in an index of terms, wherein the index of terms is part of a taxonomy database.

17. The apparatus of claim 10, wherein the at least one related word is a disambiguator associated with the first term.

18. A tangible, non-transitory computer-readable medium that stores a set of instructions that, when executed by at least one processor, cause the at least one processor to perform a method comprising:

identifying a first term in a first web page;

identifying metadata associated with the first term;

identifying, in the first web page, at least one related word for the first term;

generating a hyperlink that includes a query string associated with the first term and the at least one related word for the first term identified in the first web page, the hyperlink providing access to a second web page that comprises content items derived from search results using the query string;

scanning the content items in the second web page to identify one or more second terms; and generating further hyperlinks for the one or more second terms in the second web page.

* * * * *